United States Patent [19]
Buchner et al.

[11] Patent Number: 5,532,753
[45] Date of Patent: Jul. 2, 1996

[54] REMOTE-CONTROLLED ON-SCREEN AUDIO/VIDEO RECEIVER CONTROL APPARATUS

[75] Inventors: Peter Buchner, Leonberg; Gerd Spalink, Stuttgart, both of Germany

[73] Assignee: Sony Deutschland GmbH, Köln, Germany

[21] Appl. No.: 214,569

[22] Filed: Mar. 18, 1994

[30] Foreign Application Priority Data

Mar. 22, 1993 [EP] European Pat. Off. .............. 93104696

[51] Int. Cl.$^6$ .................................................. H04N 5/50
[52] U.S. Cl. ........................... 348/569; 348/468; 348/589
[58] Field of Search .................................... 348/468, 569, 348/563, 589, 598, 600, 553, 604, 705, 722; H04N 5/50

[56] References Cited

U.S. PATENT DOCUMENTS

| | | |
|---|---|---|
| 4,739,299 | 4/1988 | Eventoff et al. . |
| 4,745,402 | 5/1988 | Auerbach . |
| 4,810,992 | 3/1989 | Eventoff . |
| 4,963,702 | 10/1990 | Yaniger et al. . |
| 5,045,843 | 9/1991 | Hansen . |
| 5,053,585 | 10/1991 | Yaniger . |
| 5,173,778 | 12/1992 | Sasaki et al. ............................ 348/569 |
| 5,191,423 | 3/1993 | Yoshida .................................. 348/569 |
| 5,396,546 | 3/1995 | Remillard ............................... 348/468 |

FOREIGN PATENT DOCUMENTS

| | | |
|---|---|---|
| 0281677 | 9/1988 | European Pat. Off. . |
| 0340643 | 11/1989 | European Pat. Off. . |
| 0413838 | 2/1991 | European Pat. Off. . |
| 0462428 | 12/1991 | European Pat. Off. . |
| 0486989 | 5/1992 | European Pat. Off. . |
| 0489344 | 6/1992 | European Pat. Off. . |
| 1-236896 | 9/1989 | Japan . |
| 2-294165 | 5/1990 | Japan . |
| 3-88159 | 4/1991 | Japan . |
| 3-150592 | 6/1991 | Japan . |
| 4-48895 | 2/1992 | Japan . |
| 4-72996 | 3/1992 | Japan . |

OTHER PUBLICATIONS

IEEE Transactions On Consumer Electronics '1988 International Conference On Consumer Electronics, Part 1' vol. 34, No. 3, Aug. 1988, New York (US) pp. 814–818 Gunter Zeisel et al. 'An Interactive Menu–Driven Remote Control Unit For TV–Receivers And VC–Recorders'.

IEEE International On Consumer Electronics 8 Jun. 1990, Rosemont (US) pp. 164–165 Masao Ikezaki et al. 'A New Display Pointing Method For Systemized Home Equipment'.

IBM Technical Disclosure Bulletin vol. 27, No. 10A, Mar. 1985, pp. 5590–5591 Anonymous 'smooth moving for rectangular raster display areas' p. 5591, line 33–line 52.

ITT Intermetall "Bewegung statt vieler Tasten" Sonderdruck aus Funkschau 18/25. Aug. 1989.

*Primary Examiner*—Victor R. Kostak
*Attorney, Agent, or Firm*—William S. Frommer; Alvin Sinderbrand

[57] ABSTRACT

An audio and/or video reproducing apparatus receives broadcast signals from broadcasting stations and a/v signals from an external device; processes the audio and/or video input signals in accordance with multiple processing functions; selects audio and/or video input signals for reproduction; reproduces sound and/or a video picture corresponding to the selected audio and/or video input signals; and includes a pointing device and a control device for generating a control picture signal and controlling the processing of signals and a display device for displaying a control picture corresponding to the control picture signal. The control picture includes a plurality of control areas and a pointer movable within the control picture in response to operation of the pointing device, with identifications of the broadcasting stations and the external device provided within certain control areas. The control device selectively modifies the control picture or one of the control areas or controls the processing of signals in accordance with one of the control areas pointed by the pointer. Audio and/or video input signals corresponding to one of the plurality of control areas displaying one of the identifications pointed by the pointer can be reproduced.

16 Claims, 18 Drawing Sheets

Fig. 11
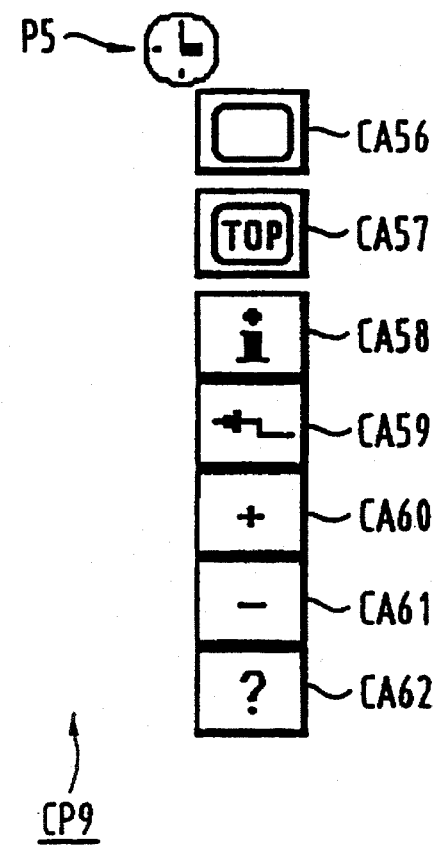

FLOW CHART: STATUS LINE DISPLAY

REMOTE-CONTROLLED ON-SCREEN AUDIO/VIDEO RECEIVER CONTROL APPARATUS

BACKGROUND OF THE INVENTION

1. Field of the Invention

The invention concerns a broadcasting signal receiver such as a television signal receiver (hereinafter, TV receiver) or a radio signal receiver (hereinafter, radio receiver). The invention concerns especially a broadcasting signal receiver having a user interface which makes it easy for users to operate the receiver.

2. Description of the Related Art

Conventional broadcasting signal receivers, especially TV receivers, have many features and various functions. The more features and functions a TV receiver has, the more control knobs and dials for selecting programs or controlling or adjusting picture and sound qualities are necessary. Most modern TV receivers have remote controller which makes such selections, controls and adjustments easier.

In such a conventional remote controller, for instance, there are 10 keys, up/down keys and toggle keys. Because there is not enough space to distribute such control keys for the exclusive use of individual functions, each key is manually or automatically changed the function correspondingly to the using conditions so as to be used alternatively for a plurality of functions. For example, 10 keys are utilized for preset and selection of programs and selection of pages of teletext. Because there are many broadcasting stations which can be received in a same area, however, it is difficult for a user to remember the correspondence between broadcasting stations and program numbers so that it is troublesome to select a desired program with 10 keys. Similarly, page selection of the teletext with 10 key is also not so easy.

Therefore, the up/down keys can be used for sequentially selecting programs or pages of teletext. The up/down keys are also used for sequentially adjusting a value of each parameter of picture or sound quality and for entering the data of such as alphabet and other characters or symbols to add or change the names of programs. The toggle keys are also used for selecting one to be operated from a plurality of functions and parameters.

In order to make such up/down keys and toggle keys used easier, on screen display control has been introduced. As examples, in case of program selection, while the program list including all receivable broadcasting stations is indicated on the screen of the TV receiver, respective programs are sequentially distinguished from the other by, for instance, blinking, highlight, or a different color with the sequential operation of the up/down keys. When the desired program is distinguished, the selection of the desired program is made by depressing a confirmation key. In case of parameter adjustment, a plurality of bars each representing a value of a parameter are indicated on the screen. When a parameter to be adjusted is selected in turn by the toggle key so that the bar of the selected parameter is distinguished from the other not selected in a similar manner as the program selection, the length of the bar is varied correspondingly to the value or level of the parameter adjusted by manipulating the up/down keys.

Such selections, adjustments or controls by the up/down keys or the toggle keys and by a limited number of keys, however, cause the user confusion or inconvenience. For example, when the user presses the up/down keys or the toggle keys with the intention of selecting the desired program or parameter or more generally the desired function, it happens frequently for the user to presses the up/down keys or toggle keys so many times as to pass the desired function, whereby the user has to keep pressing many times again until the desired function is obtained and it takes rather long time. Furthermore, when analog value of each parameter is changed in proportion to the times of pressing the up/down keys or the time length to keep pressing the up/down keys, there is a shortcoming that it takes also rather long time to adjust each parameter, if the value of the parameter should be changed greatly. Besides, there are possibly some invalid keys for controlling some functions and such invalid keys may disturb the operation of the functions.

Furthermore, because almost of all operations are performed by depressing the keys in such conventional remote controllers, in case that an operation is accompanied with an indication moving two-dimensionally on the screen, for example, in the picture-in-picture (hereinafter, PIP) mode whereby a so-called sub-picture is inserted into a so-called main-picture and both pictures are displayed simultaneously and the location of the sub-picture is changed within the mainpicture, it is inconvenient to the user that the key operation does not always adequately match with the movement of the indication on the screen. Moreover, because the locations or directions where the indication can move are limited in accordance with the key operation, it is practically impossible to design so that the indication can be located to an arbitrary place on the screen.

In user friendly TV receivers as disclosed in "Bewegung statt vielet Tasten" Funkschau 18/25 August 1989, Japanese laid-open patent publication No. 1-236896 (Sep. 21, 1989), U.S. Pat. No. 5,045,843, European Patent publication No. 0462428-A (an equivalent of Japanese laid-open patent publication No. 4-35365), Japanese laid-open patent publication No. 4-48895 (Feb. 18, 1992) and Japanese laid-open patent publication No. 4-72996 (Mar. 6, 1992), the advanced remote contoller has no up/down keys to be manipulated anymore. When the remote controller is moved or rotated, the sensor installed within the remote controller or installed in the TV receiver side detects the position, the movement or the angle of the remote controller, according to which the cursor indicated on the screen is moved upward, downward, leftward or rightward. When the cursor is located on the indication of the desired program or function on the screen, if the confirmation key or control member arranged in the remote controller is depressed, the selection of the desired program or function is completed. The indication form of the menu for control on the screen is, however, limited and the above described conventional control system does not satisfy the user.

SUMMARY OF THE INVENTION

The invention as claimed is intended to remedy these drawbacks. A pointing device is provided in an audio and/or video reproducing apparatus as a remote controller and a pointer is indicated in the control picture which is displayed on the display apparatus thereof and also includes control areas. According to the operation of the pointing device, the pointer can be freely moved within the control picture and according to the selection of one of the control areas by the operation of the pointing device, the control picture, control areas or processing circuit is controlled. The invention provides an audio and/or video reproducing apparatus in which the controls can be made by simple operations and at a high speed. The invention also provides a remote control system by which it is easy for a user to use the remote controller even in a dark room because the user can concentrate on the display of the control picture instead of the remote controller itself.

One way of carrying out the invention is described in detail below with reference to drawings which illustrated only one specific embodiment, in which:

BRIEF DESCRIPTION OF THE DRAWINGS

FIG. 11 is a schematic view showing a control picture CP9 for controlling a teletext picture of the TV receiver 1 shown in FIG. 1.

DETAILED DESCRIPTION OF THE PREFERRED EMBODIMENTS

Figure 1:
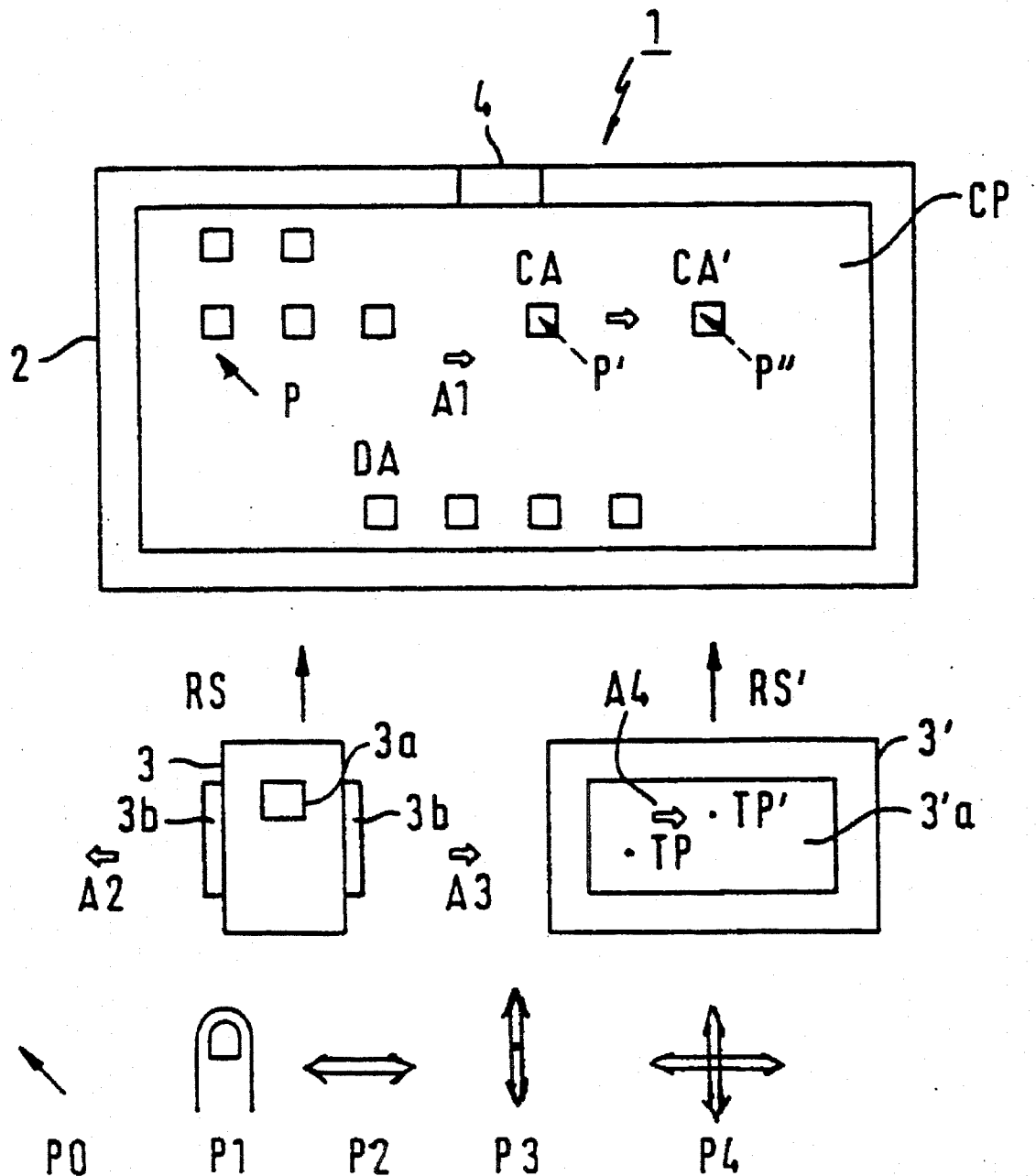
FIG. 1 is a schematic diagram showing a TV receiver 1 as an example of an broadcasting receiver in accordance with the invention.

Referring to the drawings, an embodiment of a TV receiver 1 to which the present invention is applied to will be explained. In FIG. 1, the TV receiver 1 includes, similarly to conventional TV receivers, the display apparatus 2 reproducing an input video signal, at least one wireless or wired remote controller 3 or 3' and the reception section 4 for receiving a remote control signal RS or RS' transmitted from the remote controller 3 or 3'.

The display apparatus 2 displays normally a video picture according to the input video signal and additionally the control pictures CP which indicate the functions to be selected and controlled in the TV receiver 1, the items or parameters to be selected or adjusted in relation to the selected function, and the status or value of the items or parameters. In this embodiment of the invention, the control pictures CP are formed to also include image of keys or other symbols together with words or icons related to and representative of the functions of the TV receiver 1, which define control areas CA or display areas DA. The control pictures CP are generated by pixel oriented graphics so as to be able to display fine expression. As one of the examples, the control pictures CP are generated to have pixels of 640×512 according to the required resolution and the aspect ratio of the screen of the TV receiver 1. Sixteen colors including transparent are used for each pixel to be able to display colorful control pictures CP.

On the other hand, in this embodiment of the invention, the remote controller 3 or 3' is formed as a pointing device having an operating member 3a or 3'a. As examples, mouse like used in conventional computer terminal, touch panel, track ball, joystick, light pen as well as the remote controllers described in above prior art can be utilized as such the pointing device 3 or 3'. The remote controller 3 or 3' is favorably a wireless system, not as a limitation, using infra-red or ultrasonic. The remote control signal RS or RS' is generated in the remote controller 3 or 3' correspondingly to the manipulation thereof, modulated in case of wireless system and transmitted to the reception section 4.

In the reception section 4 the remote control signal RS or RS' are received, demodulated and subjected to the process in a control signal processing circuit within the TV receiver 1, which is not shown in FIG. 1 but will be explained later.

In case of the remote controller 3, the location or movement of the remote controller 3 itself is detected in the reception section 4 in the relation between the transmitting direction of the remote control signal RS from the remote controller 3 and the location of the reception section 4 so that the location information or movement information are obtained. In case of the remote controller 3', the location information or movement information directly given to the remote controller 3' by the operating member 3'a thereof are transmitted by the remote control signal RS' to the reception section 4.

A pointer P is indicated in the control pictures CP according to the location information or movement information obtained in the reception section 4 in both cases and the position of the pointer P is controlled according to the manipulation of the remote controller 3 or 3' so as to indicate the location information or movement information in the control pictures CP. Because the pointer P is also generated by pixel oriented graphics, the pointer is arbitrarily movable in pixel-wise rather than in step-wise in the conventional system. One of the functions, items or parameters indicated in the control areas CA can be selected by the manipulation of the operating member 3a or 3'a of the remote controller 3 or 3' and the control picture CP itself is also possibly controlled according to the location relationship between the pointer P and the control areas CA and the selected one of the functions and parameters of the TV receiver 1 may be actually controlled possibly with a change of the control picture CP.

Although the manipulating method of the remote controller 3 or 3' to achieve the above controls may be different in accordance with the construction of the remote controller 3 or 3', the remote controller 3 or 3' is required to have basic control functions such as a pointing function and a click function. By the pointing function, the pointer P is moved within the control picture CP in such a manner that the pointer P as indicated by a real oblique arrow in FIG. 1 is moved, for example, as indicated by the arrow A1 to the position indicated by a dotted arrow P' so as to point a control area CA. By the click function, the control area CA where the pointer P is located is selected so that a control picture CP related to the control area CA is controlled or a function of the TV receiver 1 related to the control area CA is executed possibly with a change of the control picture CP. In addition to those functions, a move function may be necessary, by which the location, shape or size of control areas CA where the pointer P is located is moved or changed possibly with movement of the visible pointer P in such a manner that the control area CA where the pointer P' is located as shown in FIG. 1 is moved, for example, as indicated by the arrow A2 to the position indicated as CA' where the pointer P" is located, whereby the function of the TV receiver 1 related to the control area CA may be simultaneously executed possibly with a change of the control picture CP. By a drag function as a special case of the move function, the pointer P or control areas CA are moved straight.

It is favorable that the appearance of pointer P is varied to indicate the available function corresponding to the location of the pointer P in the control picture CP. More specifically, it is understandable and convenient to the user being used to the conventional TV receiver that the indications of the pointer P and the control areas CA simulate manipulations performed in relation to the operations of conventional TV receivers. For instance, when the pointer P is located in any area where the click function or the move function is invalid, the pointer P is indicated as the oblique arrow P0. When the pointer P is located in the control areas CA where the click function can be performed similarly to pressing a key with a finger, the pointer P is indicated as the finger P1. When the pointer P is located in the control areas CA where the drag function can be performed similarly to adjusting a potentiometer or attenuator, the pointer P shows the movable direction of the slider thereof. For example, the pointer P is indicated as the lateral double arrow P2, if the direction is limited to left and right, and as the vertical double arrow P3, if the direction is limited to up and down. When the pointer P is located in the control areas CA where the move function can be performed, the pointer P is indicated as the cross arrow P4 to show that the movable direction is not limited.

As one possible example, such remote controller 3 as shown in FIG. 1 has the operation member 3a on the upper side thereof and the TV receiver 1 is provided with a location detection circuit, though not illustrated. When the user depresses the operation member 3a initially before the control picture CP is displayed, the remote controller 3 is switched from the power off or power save mode to operation mode so as to transmit the remote control signal RS and to display a control picture CP. On the other hand, if the operation member 3a is released, the control picture disappears and the remote controller 3 is automatically switched from the operation mode to the power off or power save mode in a predetermined time after the operation member 3a is released.

If the remote controller 3 is further provided with one or two active keys 3b in one or both of left and right sides thereof, as shown in FIG. 1. The active key 3b is normally always manipulated when the user grips the remote controller 3 so as to switch the remote controller 3 from the power off or power save mode to the operation mode instead of the operation member 3a. If the user releases the remote controller 3 from his hand, the active key 3b is also released so as to switch the remote controller 3 from the operation mode to the power off or power save mode.

In order to prevent the TV receiver 1 from being turned on from the stand-by mode thereof by unnecessary mismanipulation of the remote controller 3, it is possible to turn on the TV receiver only when both of the operation member 3a and the active key 3b are simultaneously depresssed or preferably only when the active key 3b is firstly depressed and the operation member 3a is secondary depressed.

As the pointing function, when the remote controller 3 itself is moved up, down, left or right, for example, as shown by the arrow A2 or A3, or changed its angle to the reception section 4, while, for instance, a continuous signal as the remote control signal RS is transmitted from the remote controller 3, the location detection circuit detects the location or movement of the remote controller 3 according to the variation of the receiving condition of the remote control signal RS at the reception section 4 so that the pointer P is moved within the control pictures CP according to the detected location or movement of the remote controller 3.

As the click function, when the pointer P is located by the pointing function in a control area CA indicating a desired function in a control picture CP, an operation signal as the remote control signal RS is transmitted by pressing the operation member 3a and received at the reception section 4 so that the control area CA pointed by the pointer P is determined by the control signal processing circuit as a selected control area CA and then the control picture CP or the function of the TV receiver 1 related to the control area CA is controlled. As another example, it is possible to make the click function effective when releasing the operating member 3a after once depressed, instead of when depressing it. This prevents the click function from being effective when the pointer P gets out of the desired control area CA due to a shake by pressing the operating member 3a.

As the move function or the drag function, after the pointer P is located by the pointing function in a control area CA indicating a desired function in a control picture CP and the control area CA pointed by the pointer P is selected by the click function, when the remote controller 3 itself is moved similarly to the pointing function during pressing the operating member 3a, while, for instance, an operation signal as the remote control signal RS is transmitted from the remote controller 3, the location detection circuit detects the location or movement of the remote controller 3 according to the variation of the receiving condition of the operation signal as the remote control signal RS at the reception section 4 so that the control area CA possibly with the pointer P is moved or changed in the shape or size according to the nature of the selected control area CA and the movement of the remote controller 3, or the function of the TV receiver 1 is controlled possibly with a move of the control area CA.

As another possible example, such remote controller 3' as shown in FIG. 1 is provided with an operation member 3'a such as a touch panel, joy stick or track ball and with a location detection circuit, though not illustrated in FIG. 1, and the location information or movement information is given to the operation member 3'a without moving the remote controller 3' in itself in relation to the reception section 4.

In case that the touch panel as the operation member 3'a is provided on the upper side of the remote controller 3', under which a two dimensional matrix of the pressure sensitive elements are arranged, the location or movement information is given by contacting a contacting member like a finger of the user or any operation pen with the surface of the panel 3'a or by moving the contacting point of the contacting member on the surface of the panel 3'a from one to another, for example, as shown by the point TP, the point TP' and the arrow A4 in FIG. 1. The location detection circuit provided within the remote controller 3' detects the location or movement of the contacting member and derives a code signal as the remote control signal RS'. Some examples of such touch panel are disclosed in U.S. Pat. Nos. 4,739,299, 4,810,992, 4,963,702 and 5,053,585 and European patent publication EP 0 489 344 A1.

When the user depresses any effective part of the touch panel 3'a at the initial stage, this depress is sensed by the pressure sensitive elements corresponding to the position pressed and the remote controller 3' is switched from the power off or power save mode to the operation mode to transmit the remote control signal RS'. This condition is kept for a predetermined period after the last operation and then the remote controller 3' is automatically switched from the operation mode to the power off mode or power save mode.

As the pointing function, when the user presses the panel 3'a and moves the depressed position during the panel 3'a lightly depressed, the code signal representing each location or movement of the finger obtained by the location detection circuit is transmitted as remote control signal RS'. The remote control signal RS' being received at the reception section 4 is subjected to the process in the control signal processing circuit so that the pointer P is moved within the control pictures CP correspondingly to the movement of the depressed position on the panel 3'a.

As the click function, when the pointer P is located by the pointing function in a control area CA indicating a desired function in a control picture CP, an operation signal as the remote control signal RS' is transmitted by strongly pressing the panel 3'a at the position and received at the reception section 4 so that the control area CA pointed by the pointer P is determined by the control signal processing circuit as a selected control area CA and then the control picture CP or the function of the TV receiver 1 related to the control area CA is controlled. A hysteresis characteristic is possibly provided in order to prevent a chattering phenomenon.

As the move function or the drag function, after the pointer P is located by the pointing function in a control area CA indicating a desired function in a control picture CP and the control area CA pointed by the pointer P is selected by the click function, when the finger is moved similarly to the pointing function but during strongly pressing the panel 3'a, the location detection circuit detects the location or movement of the finger so that the control area CA possibly with the pointer P is moved or changed in the shape or size according to the nature of the selected control area CA and the movement of the finger, or the function of the TV receiver 1 is controlled possibly with a move of the control area CA.

If it, however, my be relatively difficult to move the finger during strongly depressing, the pointing function and the move or drag function can be switched over by the click function and the same pressure can be used for both of the pointing function and move or drag function. Same principles as the above each function can be also applied to joy stick or track ball.

It is selectable to make the location of the pointer P in the screen of the display apparatus 2 correspond to the location information given to the remote controller 3' either absolutely or relatively. The relative correspondence is more favourable in consideration that the user will operate the remote controller 3' during watching the TV receiver 1. A combination of the absolute mode and the relative mode is also possible. For example, when the panel 3'a is initially depressed, an absolute location of the depressed point TP reflects on the location where the pointer P is indicated in the absolute mode. This makes it easy for the user to find the initial location of the pointer P. Followingly the mode is automatically changed to the relative mode so that even if the finger once departs from the panel surface and contacts again at the different point TP', the location of the pointer P does not change unless the finger is not moved on the surface of the panel 3'a during depressing the panel 3'a. The remote controller 3 or 3' described above has a symmetrical shape in left and right to provide right handed person as well as left-handed person with a convenience. Other than the above examples of the remote controller 3 or 3', the remote controller may be provided with 4 scroll keys, a shift key and a confirmation key within the scope of the invention.

Figure 2:
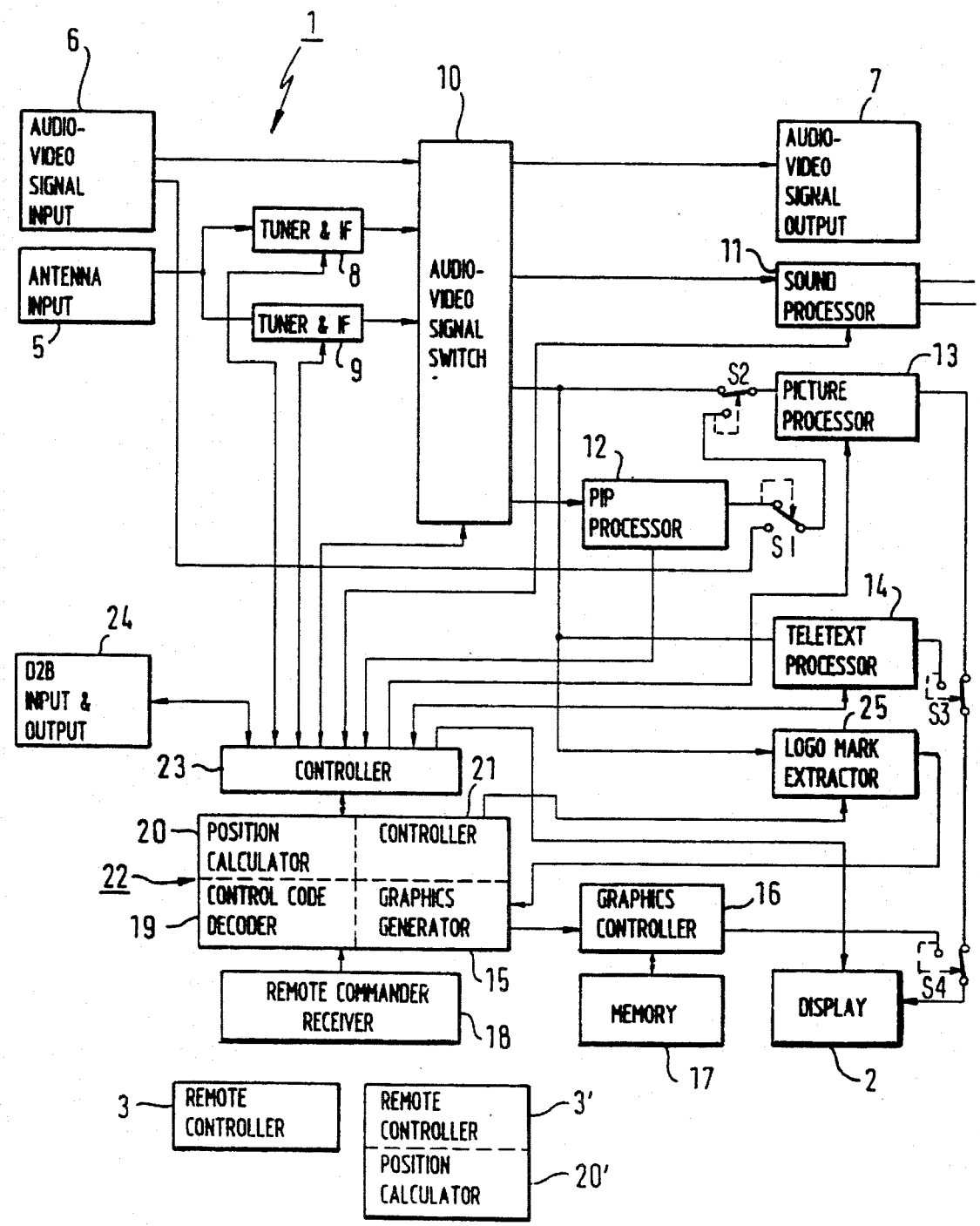
FIG. 2 is a schematic block diagram showing a circuit construction of the TV receiver 1 of FIG. 1.

Referring to FIG. 2, the circuit construction of the TV receiver 1 is now explained. The TV receiver 1 has an antenna input 5, one or more audio and video signal input (hereinafter, AV input) 6 and one or more audio and video output (hereinafter, AV output) 7. For example, the AV input 6 has terminals for first, second and third composite video inputs, a RGB input and preferably first and second Y/C video inputs, respectively being accompanied with stereo audio inputs, and the AV output 7 has terminals for first and second composited video outputs respectively being accompanied with stereo audio outputs.

The antenna input 5 is connected to two tuners 8 and 9 each including the video IF signal demodulator and stereo/dual-sound audio signal demodulator so that composite video signals and audio signals are obtained. By the way dual-sound means such as bilingual sound. The AV input 6 except the RGB video input and two tuners 8 and 9 are connected to the audio and video switcher (hereinafter AV switcher) 10 which supplies the following circuits with desired composite video signals and audio signals under the the controls described below.

One or more audio and composited video input signals except the RGB input signal selected by the AV switcher 10 are directly supplied to one or more terminals of the AV output 7 without any processing, which can be connected to external audio-video equipments such as a video tape recorder or high-fi equipments. One or more audio signals selected by the AV switcher 10 are supplied to the sound signal processor 11 in which the audio signals are subjected to desired volume, tone and balance controls and so on and selectively delivered to built-in speakers or headphones through power amplifiers, though not illustrated.

Meanwhile, among one or more composite video signals selected by the AV switcher 10, the composite video signal which is selected to be displayed as the sub-picture in the PIP mode is supplied to the PIP processor 12 in which the video signal is compressed in the size to form the sub-picture and the picture quality of the sub-picture is adjusted, and from which the compressed video signal in the RGB form is derived. The composite video signal which is selected to be displayed as the main-picture in the normal mode or in the PIP mode are converted into the RGB form in a color decoder, though not illustrated. This video signal and the compressed video signal as the sub-picture in the RGB form in the PIP mode are selectively supplied through the RGB fast switches S1 and S2 to the picture signal processor 13, in which those video signals are subjected to desired adjustments of picture quality such as sharpness, picture contrast, brightness, color intensity and hue in case of NTSC system and from which the video picture signal in the RGB form is selectively supplied through the RGB fast switches S3 and S4 to the display apparatus 2.

The composite video signal selected for the main picture by the AV switcher 10 is also supplied to the teletext processor 14 in which the teletext signal transmitted during every vertical period of the television signal is extracted and the teletext picture is formed according to the extracted teletext signal and from which the teletext picture in the RGB form is selectively supplied through the RGB fast switches S3 and S4 to the display apparatus 2.

The TV receiver 1 has the graphics generator 15 which generates a control picture signal including data representing respective colors of pixels forming the control pictures CP for displaying and used for controlling the functions of the TV receiver 1 and which is controlled by the manipulation of the remote controller 3 or 3' as described above and in detail below. The control picture signal generated by the graphics generator 15 is supplied through the graphics controller 16 to the video memory 17. The stored control picture signal is read out again from the video memory 17 and converted into the RGB form in the graphics controller 16 and selectively supplied through the RGB fast switch S4 to the display apparatus 2.

The RGB input signal accompanied with a blanking signal from the AV input 6 is separated from the other video signals from the AV input 6 and selectively supplied through the RGB fast switches S1 and S2 to the picture signal processor 13. Those picture signals in the RGB form are also accompanied with own blanking signals generated in the processors 12, 13, 14 and the graphics controller 16 according to the contents of the pictures, respectively. Therefore, the RGB fast switches S1, S2, S3 and S4 are switched by the blanking signal from the PIP processor 12 or from the external RGB input, the blanking signal from the RGB input or the PIP processor 12, the blanking signal from the teletext processor 15 and the blanking signal from the graphics controller 16, respectively. According to the above described construction, the main video picture is displayed as the background and the external RGB input signal, the sub-picture in the PIP mode, the teletext picture and the control picture are in
1 this order overlayed, in general.

The reception section 4 of the TV receiver 1 is provided with the remote control signal receiving circuit 18 for receiving the control signal RS or RS' from the remote controller 3 or 3' and the control signal decoder 19 for decoding the remote control signal RS or RS' from the receiving circuit 18 and the position calculator 20 and the controller 21 for controlling those function blocks 15, 19 and 20 and for executing the other functions. If the remote control signal RS from the remote controller 3 is received, the control signal decoder 19 detects the function of the remote controller 3 such as the pointing, click, move or drag function. If the remote controller 3 is in the pointing, move or drag function, the location calculator 20 obtains the location or movement information regarding the remote controller 3 according to the receiving condition of the remote control signal RS.

On the contrary, the position calculator 20' is provided in the remote controller 3' as described above. If the remote control signal RS' from the remote controller 3' is received, the location information or movement information which is already included in the remote control signal RS' are obtained by decoding the remote control signal RS' in the control signal decoder 19. According to the location or movement information, the pointer P is generated by tie graphics generator 15 together with the control areas CA as the control pictures CP and the object to be controlled and its controlling method is determined in relation to the pointer P and the control area CA.

The graphics generator 15, control signal decoder 19 position calculator 20 and controller 21 can be practically constructed as a micro processor 22. The information obtained in the micro processor 22 is provided to the controller 23. The controller 23 can be also constructed within the micro processor 22 together with the graphics controller 16. The controller 23 is connected to the D2B (Digital Domestic Bus) input and output 24 as described later.

The controller 23 supplies the display apparatus 2 and the function blocks 8 to 14 with control signals for controlling the display apparatus 2 and the function blocks 8 to 14 and maintains the status information of each block and feeds back the status information to the micro processor 23 which is connected to the controller 23 in a handshake manner. A program memory is provided in the controller 23, though not illustrated, for storing the information regarding the programs. Each program is defined to consist of a position in the program list, a symbol or text label to identify the program and additional data that define which signal source is to be selected from the antenna input 5 and AV input 6 and which channel frequency the tuner 8 or 9 has to be tuned to in case that the signal source from the antenna input 5 should be selected.

If one program is selected by controlling with the remote controller 3 or 3', the tuner 8 and/or AV switcher 10 are controlled to receive the corresponding broadcasting station or to select the input video signal of the AV input 6 according to the information read from the program memory and the video signal of the selected program is supplied to the display apparatus 2, while the audio signals thereof are supplied to the speakers or headphones. The controller 23 may be constructed as to be controlled by the conventional remote control code, while the control data produced in the combination of the remote controller 3 or 3' and the reception section 4 is converted in the micro processor 22 into the conventional code which is understood by the controller 23. This makes the conventional construction applicable to the TV receiver 1 according to this invention.

The control of the TV receiver 1 by using the remote controller 3 or 3' is now explained in relation to the control pictures CP displayed in the screen of the display apparatus 2. Hereafter the generalized expressions like pointing, click or move function are commonly used for explanation regardless of the kind and the construction of the remote controller 3 or 3'. Furthermore, "locate", "located", "point" or "pointed" means the operation by the pointing function, "select" or "selected" means the operation by the click function and "move" or "moved" means the operation by the move or drag function if those words are used in relation to the pointer or control area, unless there is no further explanation.

First of all, when the remote controller 3 or 3' is switched on by depressing the operation member 3a or the active keys 3b, if available and possibly in combination of depressing of the operation member 3a as mentioned above, of the remote controller 3 or the operating member 3'a of the remote controller 3' at an arbitrary position, the control signal RS or RS' is transmitted from the remote controller 3 or 3' to the reception section 4 of the TV receiver 1 as a start signal. When the control signal RS or RS' is decoded as the start signal by the control signal decoder 19, if the TV receiver 1 is in stand-by mode, the tuners 8 and/or 9, the AV switcher 10 and the display apparatus 2 are controlled by the controller 23 and the picture of a predetermined program or the last program which was seen before the TV receiver 1 was switched off is displayed on the screen of the display apparatus 2 as the initial state. On the other hand, if a picture of a program is displayed already, the picture is kept being displayed.

Subsequently or simultaneously in both cases, the control picture signal is generated by the graphics generator 15 as the pixel oriented graphics and the RGB fast switch S4 is controlled to alternately switch the control picture signal and another picture signal supplied through the RGB fast switch S3 according to the blanking signal from the graphics controller 16 so that the control pictures CP which are used for selecting programs, adjustment of picture and sound, and selection and control of other features are displayed on the screen of the display apparatus 2 to overlap the normal video picture. The control pictures include menu or key shaped symbols each consisting of words and icons representing the functions of the TV receiver 1, other related words and icons or other symbols and the pointer P. As other embodiments, the video picture can be eliminated not to be displayed during displaying the control pictures CP or the control pictures CP can be displayed as the sub-picture in PIP mode or the main picture, whereby the video picture is displayed as the sub-picture, or can be displayed in a separate display apparatus exclusively for the control pictures CP.

Figure 3:
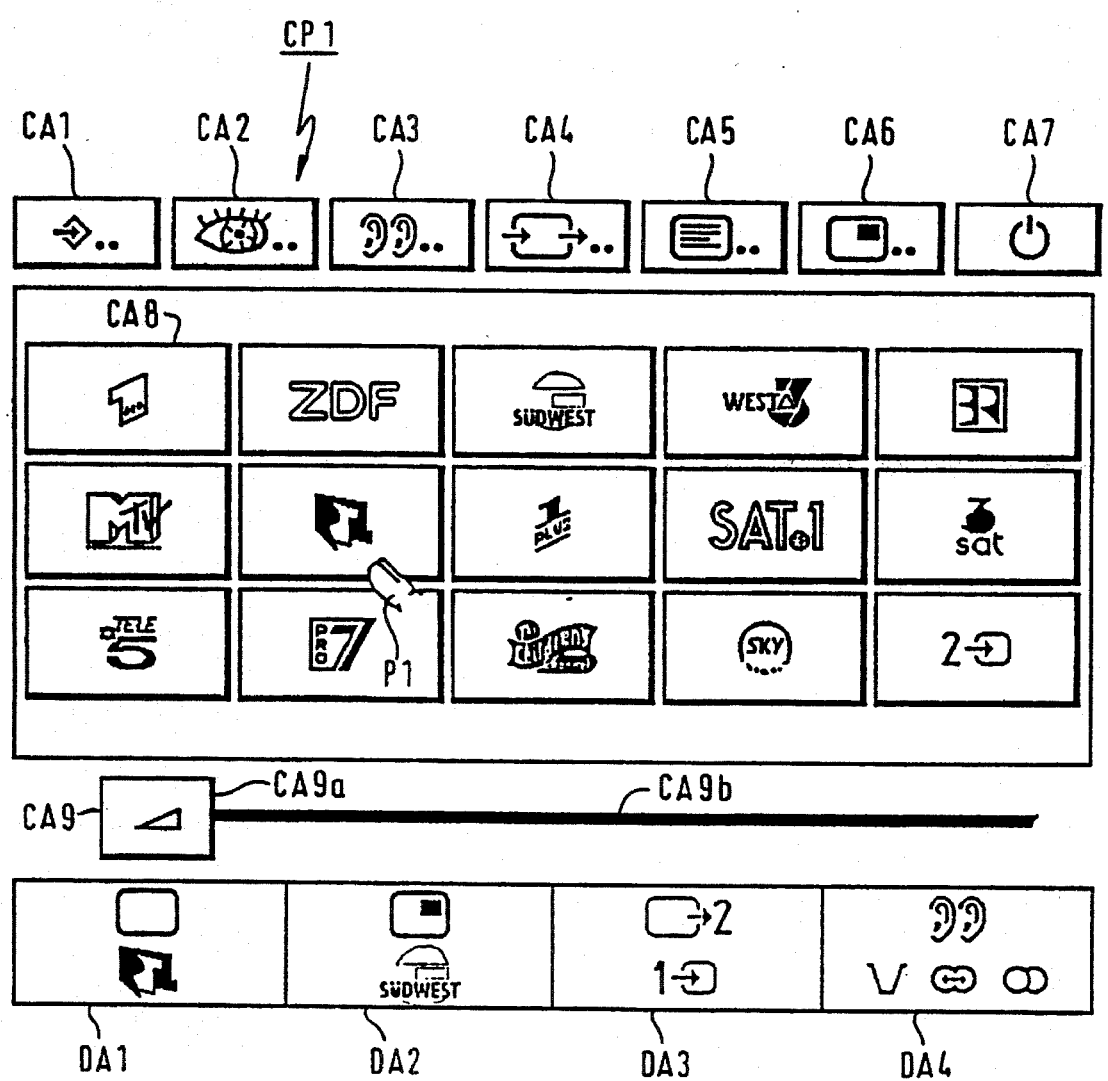
FIG. 3 is a schematic view showing a control picture CP1 for controlling the TV receiver 1 shown in FIG. 1.

Among the control pictures CP, the control picture CP1, for example as shown in FIG. 3, is displayed most preferentially the control picture CP1 includes, at the top, the menu for selecting the preset mode, picture adjustment mode, sound adjustment mode, external connection controlling mode, teletext controlling mode and PIP mode, from the left, as the control areas CA1, CA2, CA3, CA4, CA5 and CA6 each having a key shape together with an identifying symbol, and if the pointer P is located on the control areas CA1 to CA6, the pointer P is changed to the pointer P1 having a finger shape. Adjacent to the identifying symbols of those control areas CA1 to CA6, there are respective two dots which means that the control areas CA are not for directly controlling the function or mode but for further displaying another control picture CP for the function or mode. Namely, if one of these control areas CA is pointed by the pointer P1 and the control area CA is selected, the key shape of the control area CA is changed to another shape which shows the status that the key is manipulated, for example, to the shape of the key depressed so that a corresponding control picture CP for the function or mode related to the selected control area CA is displayed as a window. If the pointer P is located in a window, the window is effective and if the pointer P is located out of the window, the window is closed by the click function and the shape of the control area CA corresponding to the closed window is changed to the original shape of the key not depressed. Similarly to the above, hereinafter, the other control areas CA having the key shape are also changed to the depressed key shape by selecting with the click function, and to the key shape not depressed by releasing the selection, though not explained on all occasions. As another example, the color of the control areas CA may be changed to the color representing the selection with the click function and to the original color by releasing the click function.

The control area CA5 and the identifying symbol for the teletext controlling mode, for example, is indicated only when the controller 24 detects the condition that the teletext data is transmitted in the received program and can be reproduced as a teletext picture. Not to indicate such invalid function prevents the user from misunderstanding or misoperating. This display method can be applied to the display of the other functions.

The above described menu includes, other than the control areas CA1 to CA6, the control area CA7 for selecting the stand-by mode at the right end, in which mode the TV receiver 1 is controlled by the controller 24 to eliminate the video picture and to become the stand-by condition. The stand-by condition is again released to display the video picture, when the remote control becomes effective again as described above.

Under the menu, the program list of all the receivable broadcasting channels and selectable external inputs which are stored in the program memory of the controller 24 is displayed as a plurality of control areas CA8 with, for instance, numbers of the programs or preferably names or logo marks of the broadcasting stations or other symbols of the inputs. The order of the list is not important and can be arbitrarily preset.

When the pointer P is located on any of the control areas CA8 each representing a program position, the pointer P is changed to the pointer P1 having the finger shape. If one control area CA of a desired program is selected, the information regarding the program stored in the program memory in the controller 24 is read out so that the AV switcher 10 and also the tuner 8 or 9 in case that the selected program is supplied through the antenna input 5 are controlled to display the video picture of the program on the screen of the display apparatus 2.

Although fifteen (15) program positions are displayed as the matrix of 5×3 on the control picture CP1 shown in FIG. 3, if the dimensions of each control area CA8 representing one program position is varied, the number of the program positions which can be displayed can be increased, for example 5×4, or decreased. It may depend on the contents of the identifying symbols. If the programs or broadcasting channels are labelled with characters only, it is possible to display all the programs stored in the program memory in the controller 24 at once in the control picture CP1. If the control areas CA8 include the logo marks of the broadcasting stations, it is desirable to limit the number of the control areas CA 8 which can be displayed at once in the screen of the display apparatus 2 to maximum 30 program positions in order to keep the good resolution of the logo marks. If more than 30 program positions are designated in the program memory of the controller 24, a scroll bar can be indicated at any end of the control picture CP1 automatically, though not illustrated in FIG. 3. The pointer P is located to the control area of the scroll bar and the control area is shifted with the drag function to scroll the program list in the control picture CP1 so as to be able to display the control areas CA8 for the program positions which was not displayed within the control picture CP1.

In order to display the logo marks of the broadcasting stations in the control areas CA8, such logo mark can be generated by computer software of the micro processor, but it is also possible to store data of such logo marks in the proper memory in the micro processor 22 or the controller 24 in advance at the time of the production or the shipment of the TV receiver 1. As an advanced method, it is also possible to extract the logo marks superimposed in the video picture, which is actually broadcasted as image data. For example, the logo mark extractor 25 is provided in the TV receiver 1, which is supplied with the composite video signal of the main picture to be displayed on the display apparatus 2 and controlled by the controller 21 and the extracted logo mark is supplied to the memory of the micro processor 22. In this case, it is not necessary for the manufacturer to consider the region where the TV receiver 1 may be used. It is also possible to supply the user with a memory card in which the data of the logo marks of such broadcasting stations as to be received according to the region where the TV receiver 1 is used. The stored logo mark or any identification of the program or the broadcasting station can be also displayed during the normal video picture to replace the logo mark which is transmitted from the broadcasting station and is superimposed on the picture. As a future possibility, if the broadcasting station transmit image data of the own logo mark during the vertical blanking periods instead of the logo mark superimposed on the picture, the extractor 25 may work as an extractor for such image data.

Under the program list, the control area CA9 for controlling sound volume is displayed in the control picture CP1. The control area CA9 simulates a slide volume for sound volume control in a conventional apparatus to have the manipulating area CA9a located correspondingly to the present level of the present sound volume and the bar CA9b indicating the extent where the manipulating area CA9a can be moved. When the pointer P is located on the manipulating area CA9a, the pointer P is changed to the pointer P2 having double arrow shape. If the function of the sound volume control is selected during the pointer P2 being located on the manipulating area CA9a, the color of the manipulating area CA9a is changed for example from white to blue and the pointer P2 disappears or does not disappear otherwise, while the manipulating area CA9a is movable left and right within the extent corresponding to the bar CA9b. When the manipulating area CA9b is moved left or right, the sound signal processor 11 is controlled through the controller 24 to be able to adjust the sound volume corresponding to the position of the manipulating area CA9a, which is maintained even after the adjustment. Because this adjustment of sound volume can be performed very quickly according to the manipulation of the remote controller 3 or 3', such a muting switch as provided in a conventional TV receiver 1 may not be necessary any more.

Furthermore, the display areas DA for displaying relatively important status of the TV receiver 1 supplied from the controller 24 are provided under the control area CA9 for the sound volume control together with identifying symbols and include, from the left, the display area DA1 for displaying the symbol of the program presently displayed as the main picture, the display area DA2 for displaying the symbol of the program presently displayed as the sub-picture in PIP mode, in which "OFF" will be indicated if the PIP mode is off, the display area DA3 for displaying the symbol of the program presently supplied to the second composite video output of the AV output 7 and the display area DA4 for displaying sound status such as loudness on/off, space sound (a kind of quasi stereo sound) on/off and stereo/mono/dual-sound mode. This display areas DA are only for displaying such the status and not for controlling.

Figure 4:
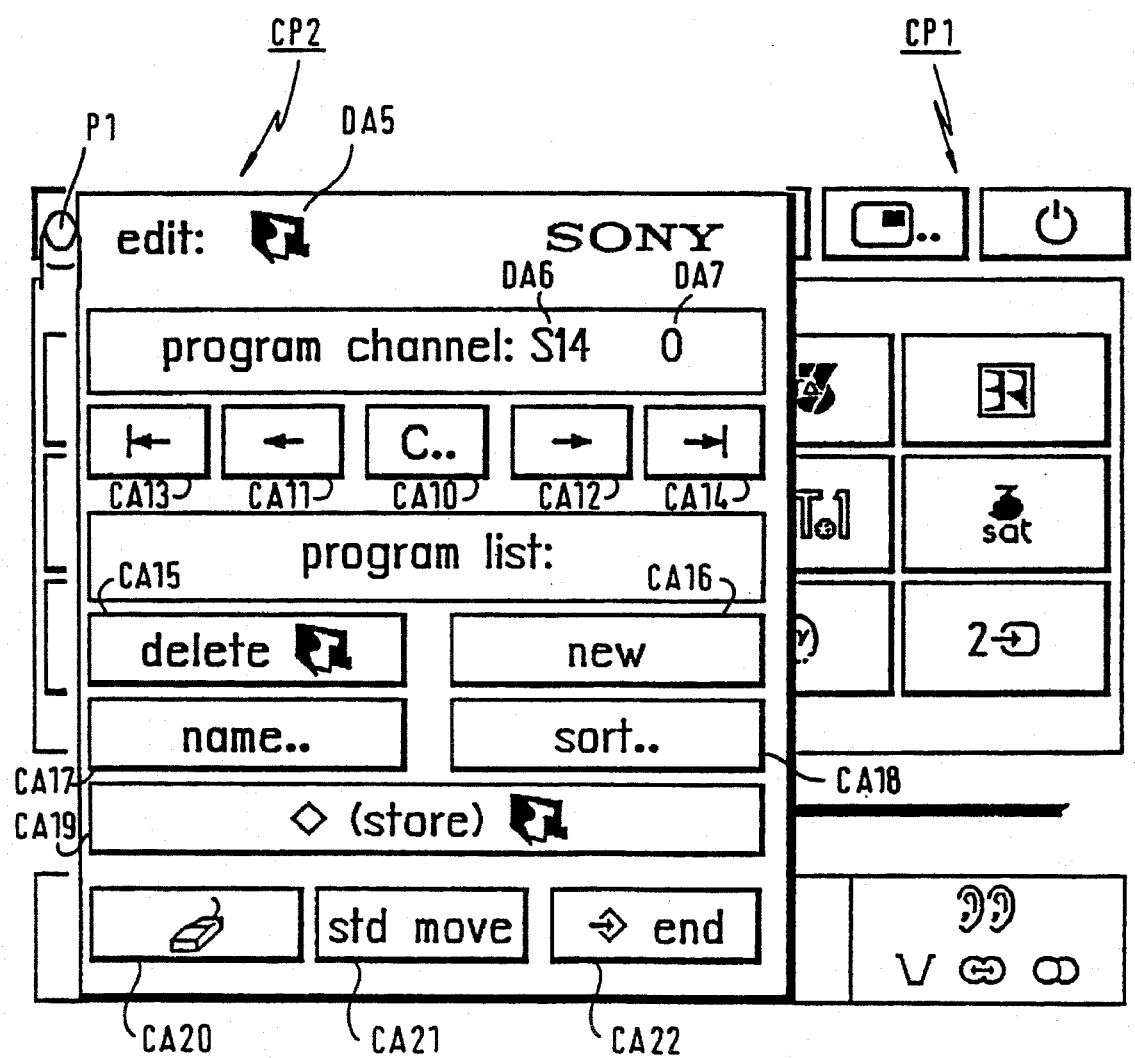
FIG. 4 is a schematic view showing a control picture CP2 for controlling a preset function of the TV receiver 1 shown in FIG. 1.

The preset mode is now explained. If the control area CA1 representing the preset mode in the control picture CP1 as shown in FIG. 3 is selected, the control picture CP2 for the preset mode as shown in FIG. 4 is displayed as a window overlapping on the control picture CP1. The control picture CP2 for the preset mode is mainly used for entering, changing or deleting programs of the program list. In the control picture CP2, there are the area labelled as "edit" having the display area DA5, the area labelled as "program channel" having the display areas DA6 and DA7, the control area CA10 having the key shape used for directly selecting a channel at the center, two control areas CA11 and CA12 each having the key shape for upward or downward fine tuning at the both sides of the control area 10, and two control areas CA13 and CA14 each having the key shape for upward or downward sequential channel search at the outside of the control areas CA11 and CA12, and the area labelled as "program list" having the control area CA15 for deleting unnecessary programs, the control area CA16 for creating new program positions, the control area CA17 for naming programs, the control area CA18 for sorting the arrangement of the control areas CA8 of the program list in the control picture CP1 shown in FIG. 3, the control area CA19 for storing the entered data in the program memory in the controller 24, the control area CA20 for selecting the type of the effective remote controller 3 or the control area CA21 for selecting the operation mode of the remote controller 3' such as the relative mode or absolute mode, and the control area CA22 for returning the control picture CP1.

The procedure to designate the different or new channel for existing or new program position is explained. In case that the channel designated for an existing program position is changed to a different channel, after the program position to be changed is first selected by using the corresponding control area CA8 in the control picture CP1, the control picture CP2 is displayed by selecting the control area CA1 so that the symbol of the selected program is displayed in the display area DA5. Thereafter, the new channel to be designated for the presently selected program is selected by using the control area CA10, CA13 or CA14.

Figure 5:
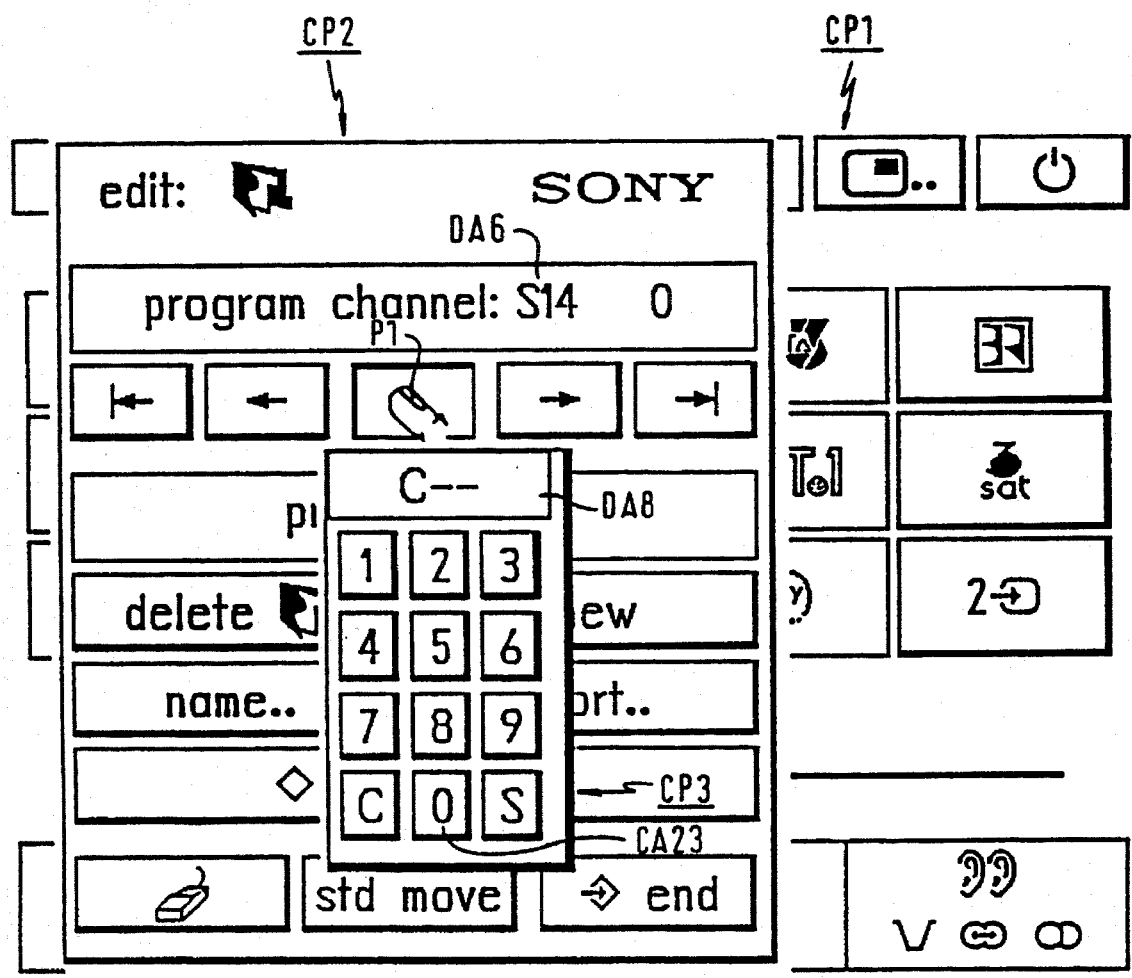
FIG. 5 is a schematic view showing a control picture CP3 for direct selecting channels in the preset function shown in FIG. 4.

If the control area CA10 is selected, the control picture CP3 as shown in FIG. 5 is displayed as a window overlapping on the control picture CP2 shown in FIG. 4. The control picture CP3 includes the control areas CA23 having two keys for entering the symbol of the category of channels such as the normal terrestrial transmission indicated as C and the cable transmission indicated as S and 10 keys for entering a channel number following the category symbol and the display area DA8 for displaying the entered channel number. For example, if the channel C01 should be entered, the control areas CA15 each having the key shape labelled with "C", "0" and "1" are sequentially selected so that the entered channel number is displayed on the display area DA8 as well as on the display area DA6 of the control picture CP2 so that the tuner 8 is tuned to the channel.

If the control area CA13 or CA14 is selected, the tuner 8 is tuned to the next or previous channel, from which a video signal is available, with respect to the channel currently received so that the channel number is automatically obtained and displayed in the display area DA6.

The control area CA11 or CA12 can be selected to perform minute adjustment of the tuner 8 or 9 and the adjusted value is accompanied with + or − to be displayed on the display area DA7 next to the display area DA6 displaying the channel number. If the selection of a channel number is completed, the window of the control picture CP3 is closed by the click function after the pointer P is moved out of the window of the control picture CP3 so that the control picture CP2 shown in FIG. 4 is fully displayed again.

In order to continue the above programming, it is necessary to go back to the control picture CP1 and to select another program from the control area CA8. In order to avoid this inconvenient steps, another control area for selecting the program may be provided in the control picture CP2.

If a new channel should be designated for a new program position, the control area CA16 is first selected to create a new program position and the new channel to be designated for the new program position is selected by using the control area CA10, CA13 or CA14 in such the manner as described above.

In order to delete any unnecessary program from the program list, after an unnecessary program to be deleted is first selected by using the corresponding control area CA8 in the control picture CP1, the control picture CP2 is displayed by selecting the control area CA1 so that the symbol of the selected program is displayed in the display area DA5 and the control area CA15. Thereafter, the control area CA15 is selected so that the program position is deleted from the program list.

Figure 6:
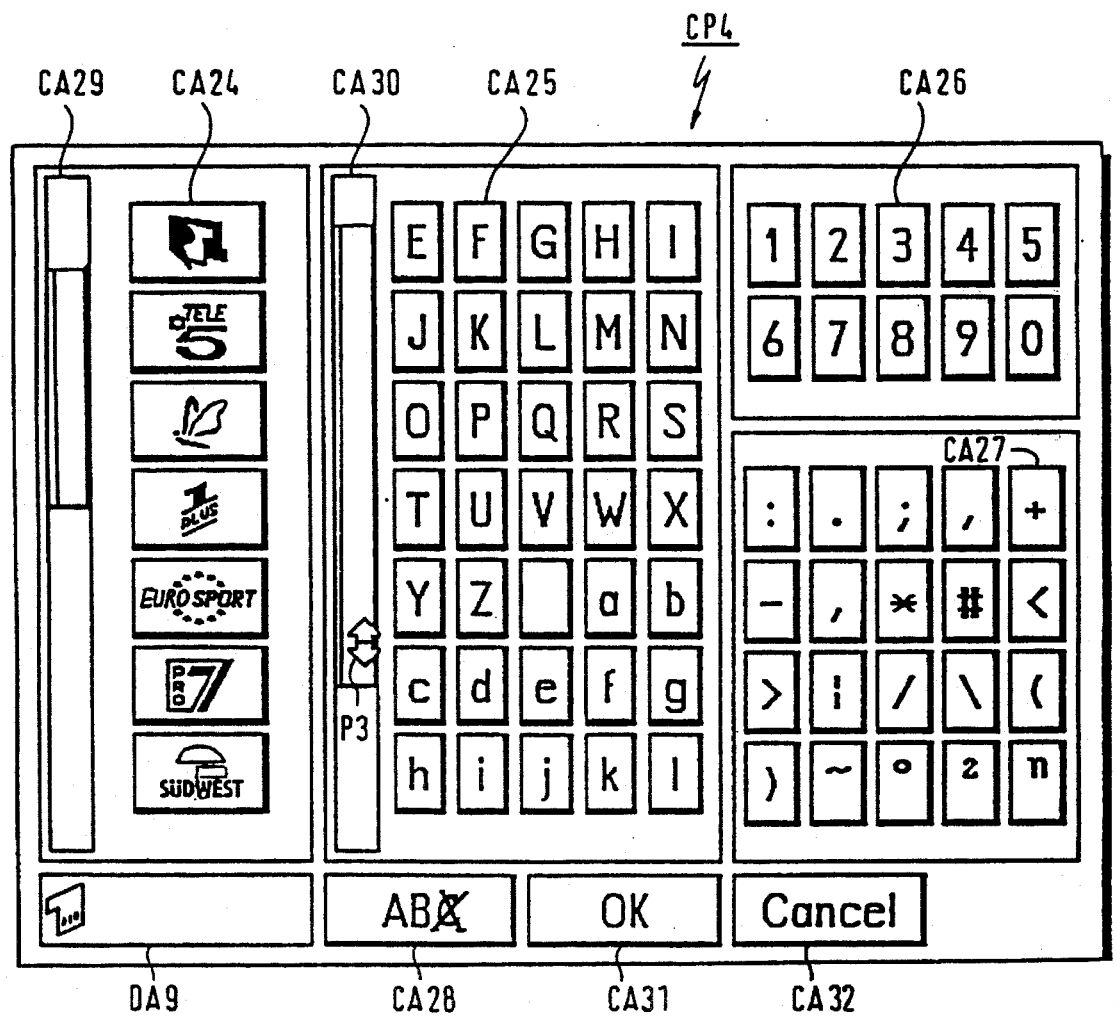
FIG. 6 is a schematic view showing a control picture CP4 for naming the program in the preset function shown in FIG. 4.

In order to give a name to the newly created program position or to change the name of the existing program position, the control area CA17 is selected so that the control picture CP4 is displayed as shown in FIG. 6. The control picture CP4 includes the control area CA24 at the left for displaying logo marks preferably each originally appointed by each existing broadcasting station and the control areas CA25, CA26 and CA27 at the center and the right for displaying alphabet, numeric and other symbols.

If the desired logo mark is selected from the control areas CA24 indicating the logo marks, the selected logo mark is displayed in the display area DA9 as well as in the control area CA28 at the left in the bottom and the graphics data itself or the relationship between the graphics data and the program position is stored in the program memory in the controller 24 in such the manner as described above. When the logo mark for the selected program position should be changed, a desired new logo mark is simply selected. If it is necessary to change the selected logo mark to another, the selected logo mark can be deleted by selecting the control area CA28, and the deleted logo mark can be replaced with a new logo mark which can be selected again in same manner as the above.

If any logo mark is not available in the TV receiver 1 even for an existing broadcasting station or if a new broadcasting station whose logo mark is not stored is newly started, or if the user does not want to use the logo mark, the name or identification of such the broadcasting station can be produced by selecting in turn in combination of the alphabet, numeric and other symbols indicated in the control areas CA25, CA26 and CA27 and the produced name or identification is displayed in the display area DA9 as well as in the control area CA28. If it is necessary to correct the name or identification produced by the combination of alphabet, numeric and other symbols during producing it, the last character of the name or identification is deleted by selecting the control area CA28, and the deleted character can be replaced with a new character which can be entered again in same manner as the above.

There are control areas CA29 and CA30 indicating scroll bars at the left side of the respective control areas CA24 and CA25 indicating logo marks and alphabet. If the pointer P is located on the control areas CA29 and CA30, the pointer P is changed to the pointer P3 having a double arrow shape. When the pointer P3 is shifted up or down with drag function, the control area CA24 or CA25 is scrolled upwardly or downwardly to reveal the control areas CA24 or CA25 which was not displayed.

When the control area CA31 indicating "OK" is selected, the selected or entered data is stored in the program memory in the controller 24 or temporarily maintained until such data is stored by controlling the control picture CP2. When the control area CA32 indicating "Cancel" is selected, the selected or entered data is not maintained. After the manipulation of the control area CA31 or CA32, the window of the control picture CP4 is closed and the control picture CP2 as shown in FIG. 4 is displayed again.

Figure 7:
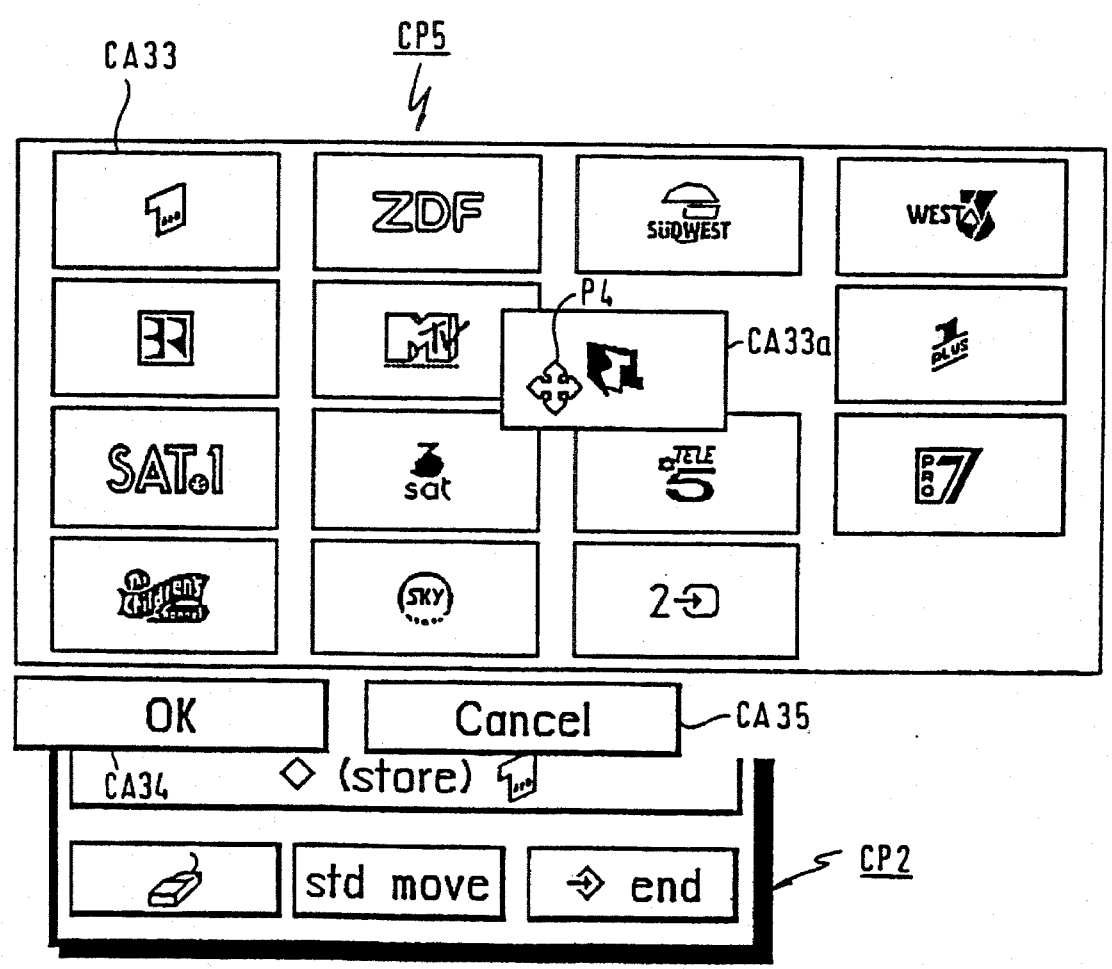
FIG. 7 is a schematic view showing a control picture CP5 for sorting the program list in the preset function shown in FIG. 4.

In the sort mode, the arrangement of the control areas CA8 in the program list shown in FIG. 3 can be modified. If the control area CA18 for sort mode in the control picture CP2 is selected, the control picture CP5 for sorting which includes a plurality of control areas CA33 as a program list as shown in FIG. 7 is displayed as a window overlapping on the control picture CP2 shown in FIG. 4. If the pointer P is located on the control area CA33a corresponding to the control area CA8 which position should be changed in the control picture CP1, the pointer P is changed to the pointer P4 having a cross arrow shape. When the control area CA33a is selected, the color of the control area CA33a is changed for example from white to blue, while the pointer P4 disappears or is still displayed as an option, so that the control area CA33a becomes movable in arbitrary direction. The control area CA33a is moved to the location where the control area CA33a should be newly located and possibly presently occupied with another control area CA33 indicating another program position. If the control area CA33a is released with the click function at the desired location, the control area CA33 which is located behind the control area CA33a and the following or preceding control areas CA33 are automatically shifted backwardly or forwardly.

The location of the control area CA33 which is fully covered or overlapped more than half by the control area CA33a when the click function is performed is determined as the location where the control area CA33a should be newly placed. Furthermore, it is also applicable to simply exchange the control area CA33a and the control area CA33 which should be replaced with the control area CA33a instead of inserting the control area CA33a between the control areas CA33 as described above.

When the modified program list is satisfactory, the control area CA34 indicating "OK" is selected to maintain the data. If the modification of the program list is to be cancelled, the control area CA35 indicating "Cancel" is selected to recover the last condition before the modification. After the maintenance or cancellation of the modification, the control picture CP2 shown in FIG. 4 is displayed again.

As an option, when the control area CA33a is moved in the sort mode, the control area CA33a during travelling may not be displayed in the same full resolution as in the still condition but in less resolution to show the outline so that the calculation time for generating the graphics of the control area CA33a can be reduced and the travelling speed can be increased. The same algorithm can be applied when a whole window is moved.

When the control area CA19 indicating "store" is selected, the preset data generated in the above course are still maintained. When the control area CA22 indicating "end" is selected, the preset data generated in the above course are finally stored in the program memory in the controller 24.

The control area CA20 accompanied with the icon of the remote controller in the control picture CP2 is provided for alternately selecting the effective remote controller 3 or 3'. Namely, if a plurality of remote controllers 3 or 3' of same type or different types are prepared for same TV receiver 1, the preferable one among the different types of remote controllers 3 or 3' can be selected according to the user or the same type of remote controllers 3 or 3' can be alternately used by the plurality of users without passing over the same remote controller 3 or 3', whereby if the control area CA20 is selected with the click function of the presently valid remote controller 3 or 3', the receiving circuit 18 is switched over to be able to accept the control signal RS or RS' from the valid remote controller 3 or 3' by the micro processor 22 so that the predetermined other remote controller 3 or 3' becomes valid after the selection and the corresponding icon of the valid remote controller 3 or 3' may be displayed in the control area CA20.

The control area CA21 indicating "std move" is provided for alternately selecting the operation mode of the remote controller 3' as either of relative mode or absolute mode as described above.

Figure 8:
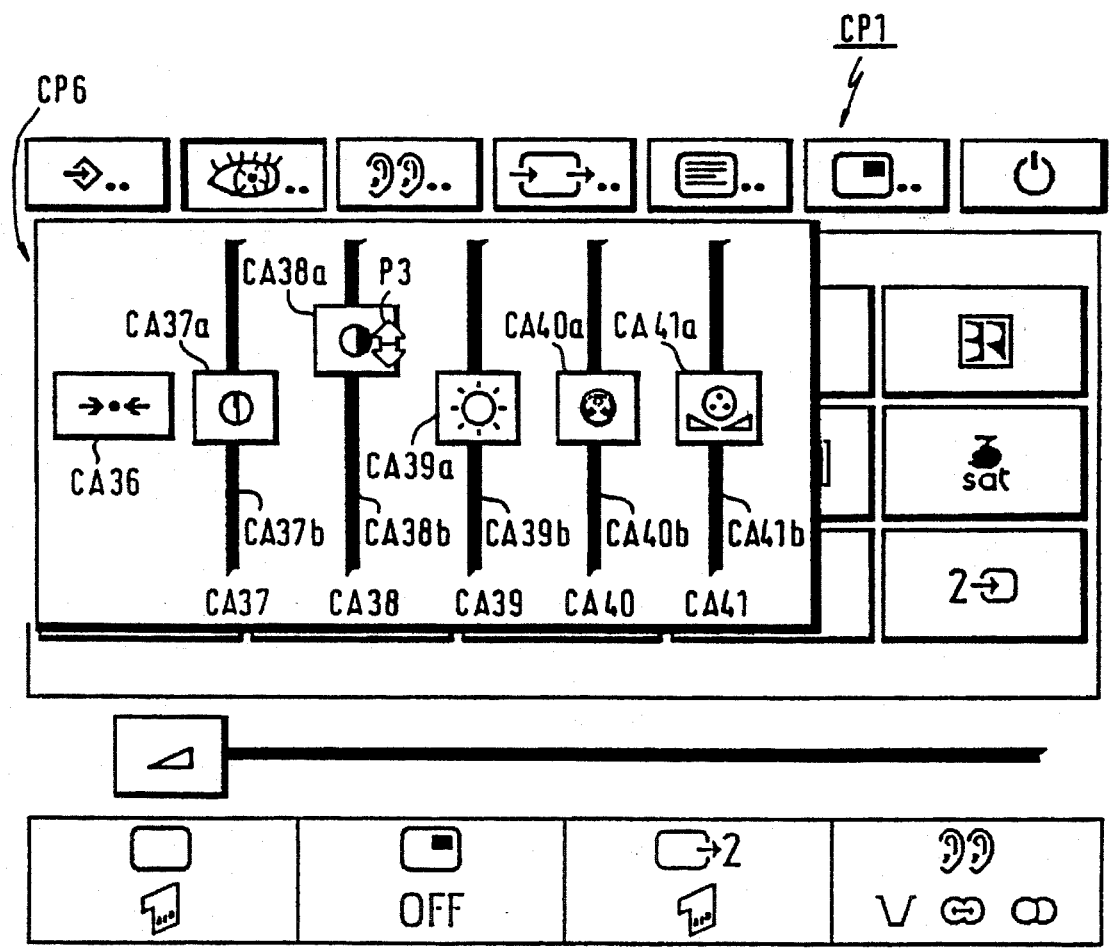
FIG. 8 is a schematic view showing a control picture CP6 for adjusting picture qualities of the TV receiver 1 shown in FIG. 1.

The picture adjustment mode is now explained. When the control area CA2 in the control picture CP1 shown in FIG. 3 is selected, the control picture CP6 for adjustment of picture quality as shown in FIG. 8 is displayed as a window overlapping on the control picture CP1 shown in FIG. 3. The control picture CP6 includes, from the left, the control areas CA36, CA37, CA38, CA39, CA40 and CA41 respectively for selecting default or original factory setting values, for adjusting sharpness, picture contrast, brightness, color intensity and hue in NTSC standard. Other than the control area CA36, each control area CA37 to CA41 simulates a slide volume movable up and down similarly to the sound volume control as described above to have the manipulating areas CA37a to CA41a located correspondingly to the present parameter values, respectively and the bars CA37b to CA41b indicating the extent where the manipulating areas CA37a to CA41a can be movable, respectively.

When the pointer P is located on for example the manipulating area CA38a for sharpness control, the pointer P0 is changed to the pointer P3 having a vertical double arrow shape. If the manipulating area CA38a for the sharpness control is selected, the color of the manipulating area CA38a is changed for example from white to blue and the pointer P disappears or does not disappear otherwise, while the manipulating area CA38a is movable up and down within the extent corresponding to the bar CA38b. When the manipulating area CA38a is moved up or down, the picture signal processors 13 is controlled through the controller 24 to be able to adjust the sharpness of the video picture corresponding to the position of the manipulating area CA38a, which is maintained even after the adjustment. Other functions are similarly performed.

When the control area CA36 for the default value selection is selected, parameters of picture quality such as sharpness, picture contrast, brightness, color intensity and hue in NTSC standard are adjusted to recover the values which were preset at the time of the production or shipment of the TV receiver 1 so as to produce a video picture of a standard quality even if the parameters have been differently adjusted by the user.

Figure 9:
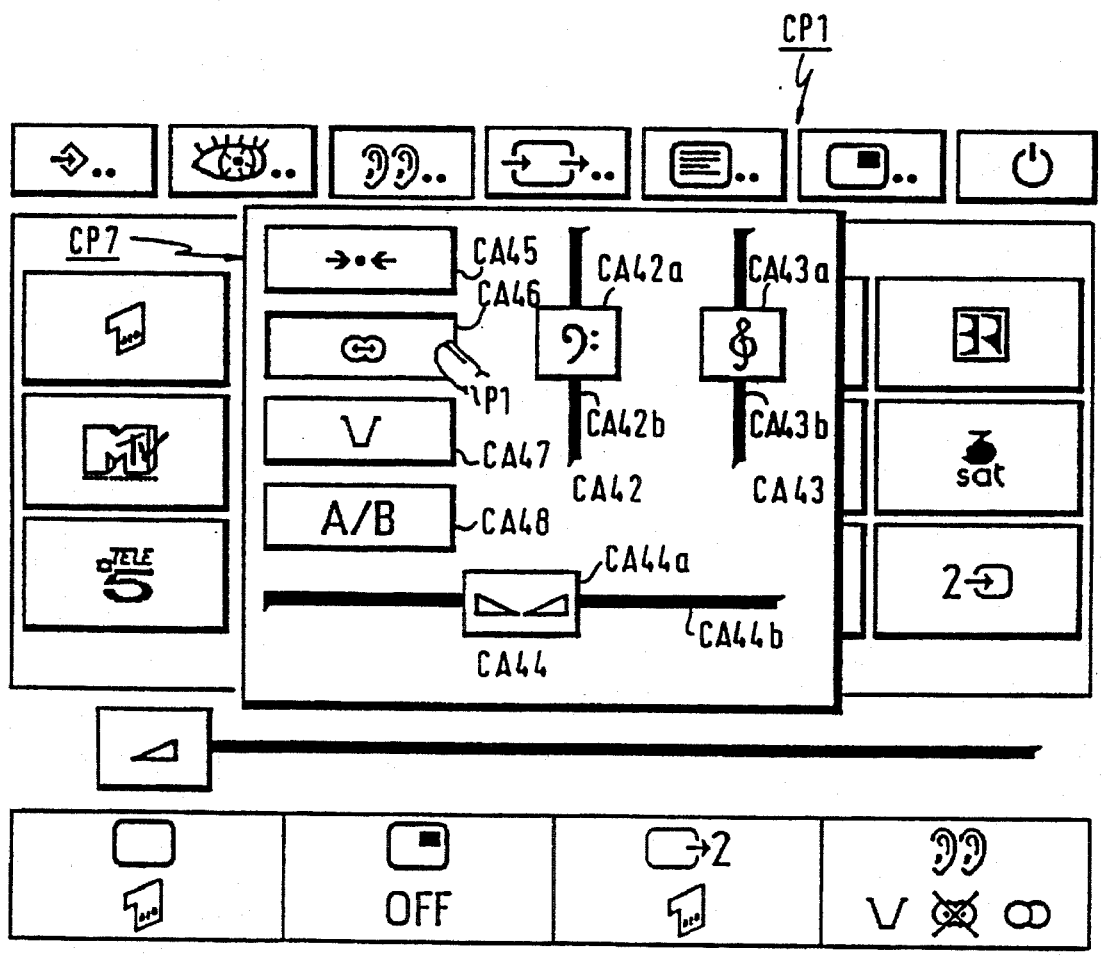
FIG. 9 is a schematic view showing a control picture CP7 for adjusting sound qualities and for selecting sound reproduction mode the TV receiver 1 shown in FIG. 1.

The sound quality adjustment mode is now explained. When the control area CA3 in the control picture CP1 shown in FIG. 3 is selected, the control picture CP7 for adjustment of sound quality and mode as shown in FIG. 9 is displayed as a window overlapping on the control picture CP1 shown in FIG. 3. The control picture CP7 includes, at the right in the top, the control areas CA42 and CA43 respectively for adjusting bass and treble of the sound which simulate slide volumes having the manipulating areas CA42a to CA43a which are movable up and down similarly to the picture adjustment described above and located correspondingly to the present parameter values, respectively and the bars CA42b to CA43b indicating the extent where the manipulating areas CA42a to CA43a can be movable, respectively. The control picture CP7 also includes, at the bottom, the control areas CA44 for adjusting balance of the sound which also simulates slide volume having the manipulating area CA44a which is movable left and right similarly to the sound volume control and located correspondingly to the present balance and the bar CA44b indicating the extent where the manipulating area CA44a can be movable. By manipulating those control areas CA42 to CA44 in the same way as the control areas for sound volume control and picture adjustment, the sound signal processor 11 is controlled through the controller 24 to be able to adjust the sound level of low frequency band, the sound level of high frequency band, the balance of the left and right sound levels.

The control picture CP7 further includes, at the left in the top, the control areas CA45, CA46, CA47 and CA48 for selecting default or original factory setting values, space sound on/off, loudness on/off and sound channel A/B in the dual-sound mode. Other than the control area CA45 the control areas CA46 to CA 48 having key shape simulate toggle switches. By every selecting those control areas CA46 to CA48, the space sound on/off, loudness on/off and sound channel A/B in the dual-sound mode are alternately selected by the sound signal processor 11 through the controller 24 and the present status are displayed in the control areas CA46 to CA48 respectively as well as in the display area DA4 of the control picture CP1 shown in FIG. 3. The control area CA48, however, is displayed in the control picture CP7 only when the controller 24 detects that the dual-sound broadcasting is received.

When the control area CA45 for the default value selection is selected similarly to the picture control, all of those parameters of sound quality such as bass, treble and balance are adjusted to recover the values which were preset at the time of the production or shipment of the TV receiver 1 so as to produce a sound of a standard quality, even if the parameters have been differently adjusted by the user. As another embodiment, the control picture CP7 can be provided with another control area for sound volume control corresponding to the control area CA9 for sound volume control in the control picture CP1. In that case, making the control data corresponding to the lastly manipulated one between those control areas effective is convenient when it is desired to change the sound volume during the adjustment of the sound parameters by using the control picture CP7.

Figure 10:
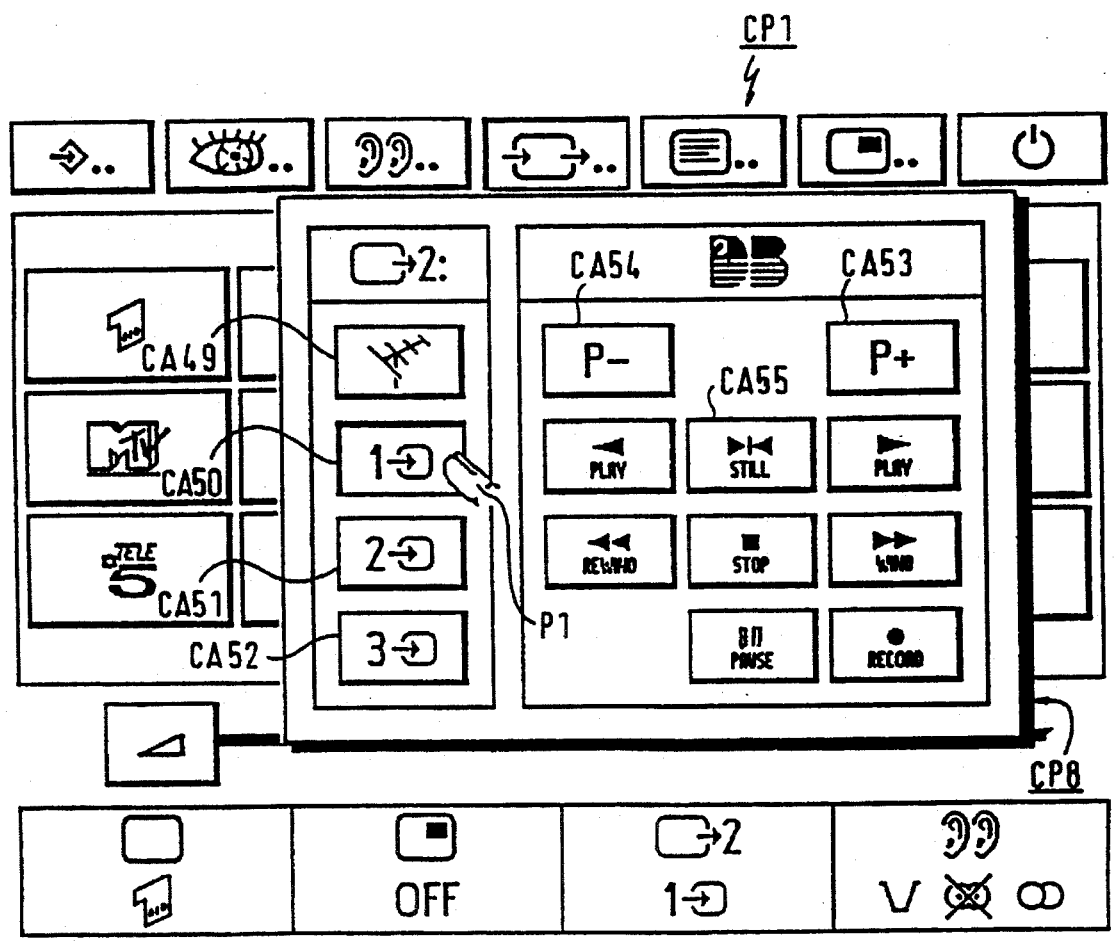
FIG. 10 is a schematic view showing a control picture CP8 for controlling output connections of the TV receiver 1 shown in FIG. 1.

The output selection mode is now explained. When the control area CA4 in the control picture CP1 shown in FIG. 3 is selected, the control picture CP8 as shown in FIG. 10 is displayed as a window overlapping on the control picture CP1 shown in FIG. 3. The control picture CP8 includes, at the left side, the control areas CA49, CA50, CA51 and CA52 each having key shape with symbols of antenna input 5, the first, second and third composite video inputs of the AV input 6. By selecting one of the control areas CA49 to CA52, the AV switcher 10 is controlled by the controller 24 so that the video and accompanied audio signal corresponding to the selected control area CA49, CA50, CA51 or CA52 is supplied to the second composite video output of AV output 7 and the display area DA3 of the control picture CP1 indicates the symbol of the selected output. As another example, the logo mark or name of the broadcasting station actually received in the tuner 8 or the kinds of the signals supplied to the input can be indicated in the control areas CA49 to CA52 in more detail.

The control picture CP8 also includes, at the right side, the control areas for enabling the external apparatus such as VTR which is connected to the TV receiver 1 through D2B input and output 24 to be controlled. In this embodiment, the control areas CA53, CA54 and CA55 are provided for fundamental operations of the VTR with a built-in TV tuner. By selecting the control area CA53 or CA54 each having key shape, the program position of the built-in tuner is upwardly or downwardly selected and the control signal for selecting the program position can be supplied through the D2B input and output 24 and the selected program position can be displayed on the display of the VTR. By selecting the control areas CA55 each having key shape, the control signal for selecting the functions such as the forward play, backward play, still play, stop, fast forward winding, fast backward winding, recording, pause is transmitted through the D2B input and output 24 and the selected function can be performed. Any other audio-visual equipments or other equipment can be operated by connecting through D2B in,mat and output 24 in the similar manner.

The teletext control mode is now explained. When the control area CA5 in the control picture CP1 shown in FIG. 3 is selected, the teletext processor 14 is controlled by the controller 24 to extract the teletext data which is multiplexed during the vertical blanking period in the video signal which is presently received. The teletext picture signal constructed in the teletext processor 14 is supplied to the display apparatus 2 through the RGB fast switch S2 so that the front page of the teletext picture, as the initial state, is displayed on the screen of the display apparatus 2 as possibly superimposed on the video picture. Furthermore, the control picture CP9 necessary for controlling the teletext picture as shown in FIG. 11 is displayed at the right side of the teletext picture together with the pointer P0.

If the pointer P0 is located on any page number, the page number is visually enhanced, for instance, by the frame in the basis of the location of the coordinates on the screen. If the enhanced page number is selected when the pointer P0 is located on the desired page number so that desired page of the teletext is displayed.

In the teletext processor 14, the character data transmitted in the vertical period of the TV signal is stored in a teletext memory thereof. Each character data of the teletext data corresponds, for example, to 20×13.5 pixels of the teletext picture on the screen of the display apparatus 2. Therefore, the location of the pointer P0 in the coordinates (x, y) of the screen is converted to the coordinates (ROW, COLUMN) of the teletext memory according to the following equation:

ROW=(y−35)/20

COLUMN=2(x−33)/27

In order to realize the above page selection, the character data adjacent to the point (ROW, COLUMN) in the coordinates of the teletext memory is read out from the teletext memory and examined if the numeric data included in the read out character data is a valid page number.

If any numeric representing no page number on the teletext picture is pointed by the pointer P0, the numeric can be automatically recognized as representing no page number according to the rule of the arrangement of characters in the teletext picture. As such the rules, for example, page number always consists of 3 digits, the first digit is one of 1 to 8 and is not 0 or 9, the 3 digits is located the beginning of the line or followed or preceded by ".", "−", "/", "(", ")" or "P" or "S" meaning page and so on. There is a case that the page number is indicated in enlarged numeric over twolines and it is necessary to be considered that space data is located in the location pointed by the point P0 and the numeric data is located in the preceding line. If the page number pointed by the pointer P0 is determined as valid, the page number is enhanced and the numeric data representing page number is stored for use by the click operation.

The click function is invalid when the pointer P0 is located on no enhanced page number. The search for a valid page number pointed by the pointer P0 can be performed continuously as long as a teletext picture is displayed.

The control picture CP9 includes, from the top at the right side, the control areas CA56, CA57, CA58, CA59, CA60, CA61 and CA62, respectively for returning to the video picture, for controlling TOP menu, for displaying the index page, normally page 100, for displaying the page lastly displayed before displaying the present page, for displaying the following page, for displaying the preceding page and for displaying hidden answer when questions are displayed in the teletext picture. If the control area CA56 is selected, the teletext processor 14 is controlled through the controller 23 and the RGB fast switch S3 is controlled by the teletext processor 14 so that the video picture is displayed without returning to the control picture CP1. If the other control areas CA57, CA58, CA59, CA60, CA61 and CA62 are selected, the teletext processor 14 is controlled through the controller 23 so as to perform each function as the above. If such data as TOP menu or questions are not transmitted, the graphics generator 15 is controlled through the controllers 23 and 21 so as not to display the control area CA57 or CA62 according to the detection in the teletext processor 14.

The teletext data normally includes the present time information and if the pointer P is located on the present time indication, the pointer P0 is changed to the pointer P5 having a clock shape. When the area indicating the present time information is selected, the present time is displayed as superimposed on the normal video picture.

Figure 12:
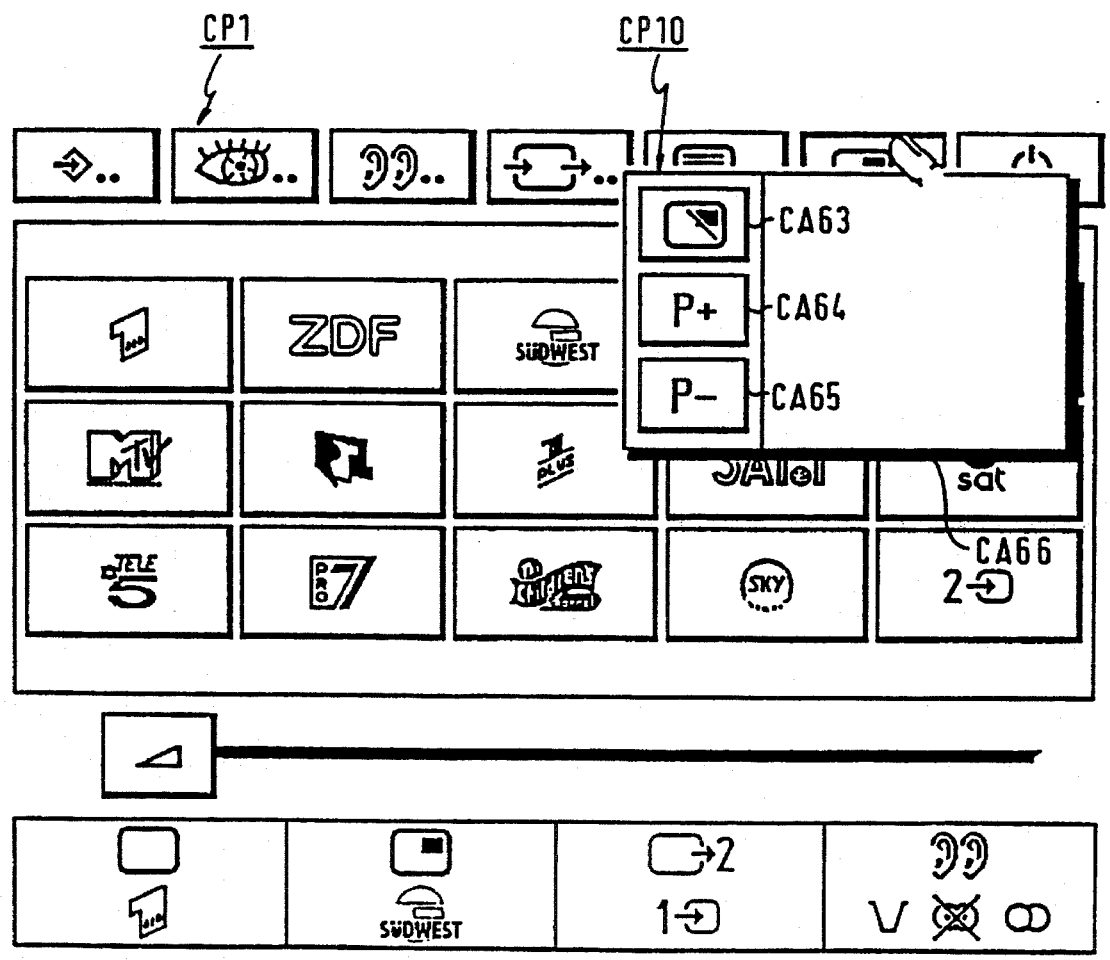
FIG. 12 is a schematic view showing a control picture CP10 for controlling PIP function of the TV receiver 1 shown in FIG. 1.

The PIP mode is now explained. When the control area CA6 in the control picture CP1 shown in FIG. 3 is selected, the PIP mode is turned on by controlling the tuner 9 and the PIP processor 12 through the controller 23 and the control picture CP10 as shown in FIG. 12 is displayed as a window overlapping on the control picture CP1 shown in FIG. 3. The control picture CP10 includes, at the left side, the control areas CA63 having toggle switch key shape for selecting PIP mode on/off, the control areas CA64 and CA65 each having key shape for upwardly or downwardly selecting a program to be shown in the sub-picture in the PIP mode. The control picture CP10 also includes, at the right side, the control areas CA66 for displaying the picture of the selected program and for exchanging the main picture and sub-picture in the PIP mode.

When the control area CA63 is selected, the PIP mode is switched between on and off. Namely while the control picture CP10 is displayed, if the control area CA63 is first selected with the click function, the PIP mode is then turned off and if the control area CA63 is again selected, the PIP mode is then turned on. It is also possible to automatically close the window of the control picture CP10 and display the control picture CP1 or normal video picture after the PIP mode is turned off by selecting the control area CA63. When the control area CA64 or CA65 is selected, the program can be selected upwardly or downwardly so that the video picture signal of the selected program is compressed in the PIP processor 12, the compressed video picture is displayed in the control area CA66, while the identifying symbol of the program is displayed in the display area DA2 in the control picture CP1.

In order to exchange the main picture and the sub-picture in the PIP mode, the pointer P is located within the control area CA66 and the control area CA66 is selected so that the AV switcher 10 is controlled to exchange the main picture and the sub-picture. It is also possible to change the position or the size to display the sub-picture in the PIP mode. For example, in order to change the location to display, the pointer P is located on the side of the frame of control area CA66 corresponding to the direction to be moved and the control area CA66 is moved with the move function, and in order to change the size to display, the pointer P is located on the corner of the frame of control area CA66 corresponding to the direction to be enlarged or reduced and the control area CA66 is enlarged or reduced with the move function. If this feature is not used, it is also possible to exchange the main picture and the sub-picture by pointing and selecting the frame of the control area CA66.

Figure 13:
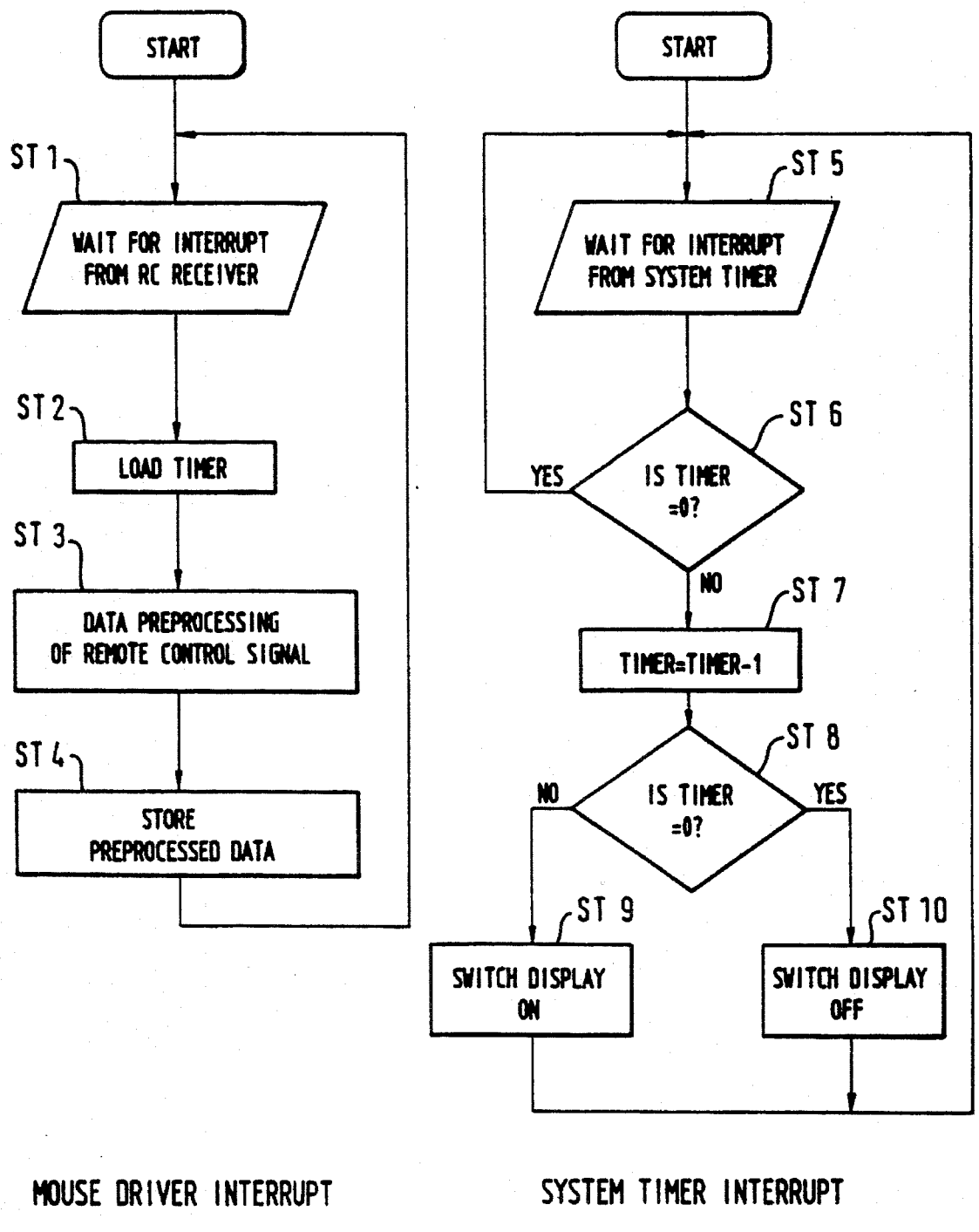
FIG. 13 is a flow chart showing steps to display the control pictures shown in FIG. 1 and FIGS. 3 to 12.

Referring to flow charts, some examples of the operation of the TV receiver 1 by using the control pictures CP are now explained. In FIG. 13, in order to display and eliminate the control picture CP, it is detected in the step ST1 whether the remote controller 3 or 3' is manipulated or not. The preset value is loaded into a timer in the micro processor 22 in the step ST2. In the step ST3, the received remote control signal RS or RS' is preprocessed so that, for example, the coordinates of the pointer P to be indicated or the control area CA to be controlled is obtained from the control signal decoder 19 or calculated in the position calculator 20. In the step ST4, the preprocessed data are stored in the memory of the micro processor 22 so that, for example, data of the coordinates of the pointer P and the control area CA to be controlled are stored. Meanwhile, the micro processor 22 is counting the timer and when it is decided to check the timer count in the step ST5, the timer count is checked in the step ST6. If the time is not out, the timer count is decremented by one in the step ST7 and it is checked again whether the time is out in the step ST8. If the time is not still out, it is decided to keep displaying the control picture CP in the step ST10 and if the time is out, it is decided to eliminate the control picture CP in the step 10. With the above steps it is possible to automatically eliminate the control picture CP so as to fully display the video picture in a predetermined period after the remote controller 3 or 3' is lastly manipulated.

Figure 14:
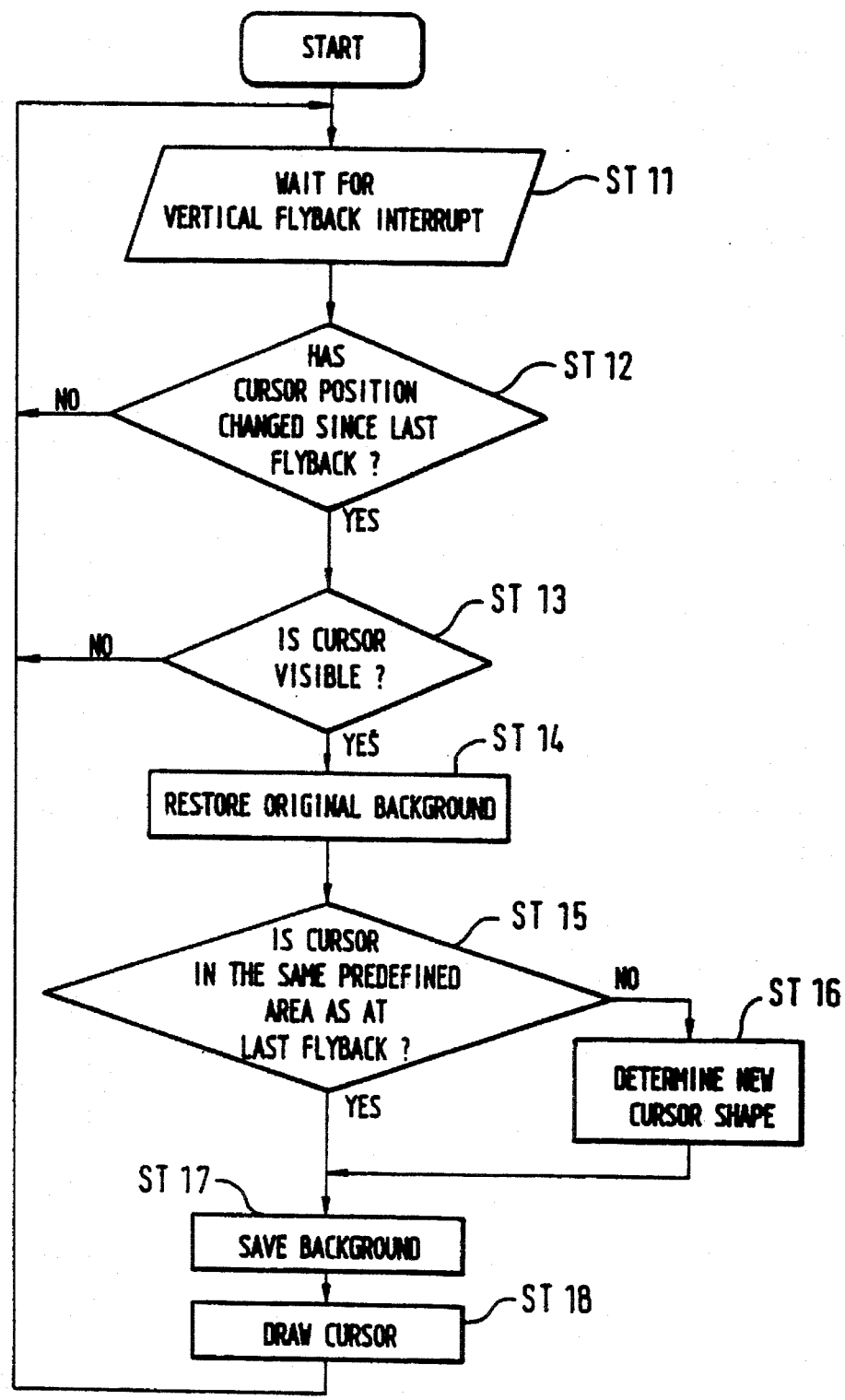
FIG. 14 is a flow chart showing steps to display the pointer P in the control picture shown in FIG. 1 and FIGS. 3 to 12.

In FIG. 14, in order to display and move the pointer P in the control picture CP, when it is detected in the step ST11 that the display apparatus 2 is in the vertical blanking period, it is determined in the step ST12 according to the information from the location calculator 20 or 20' whether the location to display the pointer P should be changed. If it is not necessary to move the pointer P, it is left as it is. In the step ST13, it is determined whether the pointer P should be eliminated from the control picture CP. If it is necessary to move or eliminate the pointer P, the location where the pointer is presently located is painted, in the step ST14, with the background image as stored in the step ST17 as explained below. It is determined in the step ST15 whether the area where the pointer P will be moved is same as that where the pointer P is presently located and if the area is different from the present one, the shape of the pointer P to be displayed is determined in the step ST16 according to the area. In the step ST17, the background image to be covered by the pointer P at the location where the pointer P is moved is stored and the pointer P is displayed in the new location in the step ST18 (Pointer P=cursor).

Figure 15:
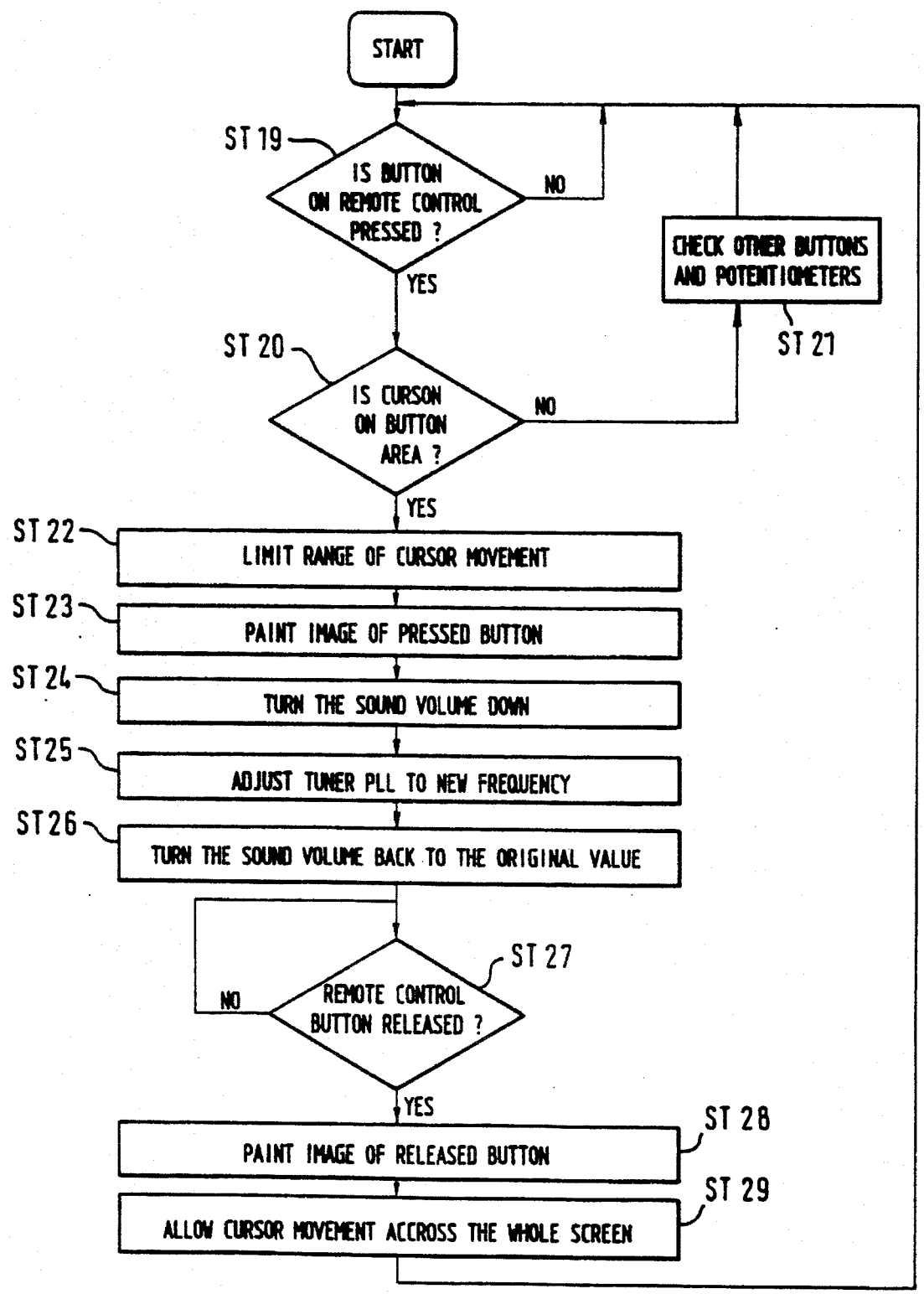
FIG. 15 is a flow chart showing steps to select a program in the control picture CP1 shown in FIG. 3.

With regard to the case that a control area CA having the key image in the control picture CP changes its shape between the depressed key shape and the undepressed key shape as described above, the case of the program selection is, as an example, now explained referring to FIG. 15. It is determined in the step ST19 whether the click function of the remote controller 3 or 3' is operated. If the click function is operated, it is determined in the step ST20 whether the pointer P is located in the control area CA, for example in the control areas CA8 of the program list. If the pointer P is not within the control areas CA8 in the program list, it is checked whether the pointer P is in the other control areas CA in the step ST21. If the pointer P after the click function is operated is in one of the control areas CA8, the location to display the pointer P1 is controlled to limit within the extent of the control area CA8 in the step ST22. By this limiting, even if the reception section 4 receives the remote control signal RS or RS' to move the pointer P1 due to misoperation of the remote controller 3 or 3', the operation of the program selection becomes very stable. The shape of the control area CA8 is changed to the shape of the depressed key in the step ST23. After the sound controller 11 is controlled through the controller 24 to mute the sound signal of the presently displayed program in the step ST24, the program data corresponding to the control area CA8 is read out from the program memory of the controller 24 to be loaded into a PLL (Phase Locked Loop) circuit of the tuner 8 in the step ST25 so that the selected program is received or to control the AV switcher 10 to display the video picture of the desired program. The sound processor 11 is controlled to release the muting operation again to supply the sound signal of the newly selected program in the step ST26. It is detected in the step ST27 whether the click function is released and if released, the shape of the control area CA8 is changed to the shape of the unpressed key in the step ST28. In the step ST29, the pointer P1 is controlled to be able to move out of the extent of the control area CA8.

Figure 16:
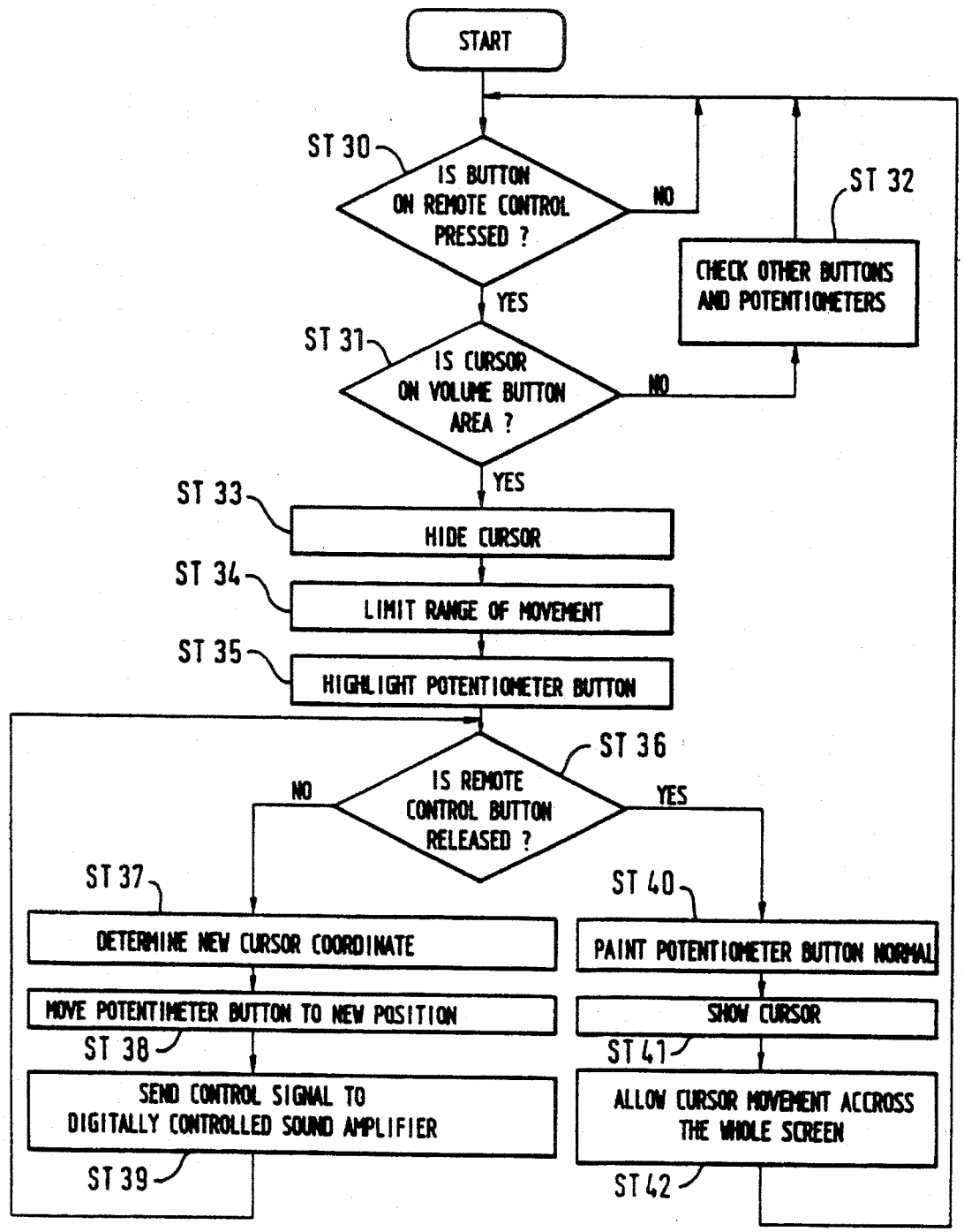
FIG. 16 is a flow chart showing steps to control the sound volume in the control picture CP1 shown in FIG. 3.

With regard to the case that the control area CA in the control picture CP is controlled with the move or drag function as described above, the case that sound volume is controlled by using the control area CA9 in the control picture CP1 is, as an example, now explained referring to FIG. 16. It is determined whether the click function of the remote controller 3 or 3' is operated in the step ST30. If the click function is operated, it is determined in the step ST31 whether the pointer P is located in the control area CA, for example in the manipulating area CA9a of the control areas CA9 for sound volume control. If the pointer P is not within the manipulating area CA9a, it is checked whether the pointer P is in the other control areas CA in the step ST32. If the pointer P2 after the click function is operated is in the manipulating area CA9a, the display of the pointer P2 is eliminated, in case that the pointer P2 is not displayed, in the step ST33. The location to display the pointer P2, if the pointer P2 is still displayed, is controlled not to move in the vertical direction in the step ST34. By this limiting, even if the reception section 4 receives the remote control signal RS or RS' to move the pointer P2 due to misoperation of the remote controller 3 or 3', the selection of the sound volume control function and the display of the pointer P2 become very stable. The color of the manipulating area CA9a is changed to the color representing the function selected in the step ST35. After it is checked in the step ST36 whether the click function is still effective, if the click function is still effective, the location of the manipulating area CA9a to be moved with the drag function is calculated by the location calculator 21 or 21' in the step ST37 and the manipulating area CA9a is moved to the location in the step ST38. Simultaneously the sound processor 11 is controlled through the controller 24 to adjust the sound volume corresponding to the location of the manipulating area CA9a in the step ST39. This is continuously done as far as the drag function is effective. On the contrary, if the click function or the drag function becomes ineffective by releasing, the original color of the manipulating area CA9a is recovered in the step ST40, and the pointer P2 is displayed again in the step ST41, if the pointer P2 is eliminated in the step ST33. In the step ST42, the pointer P is controlled to be able to move out of the extent of the manipulating area CA9a.

Figure 17:
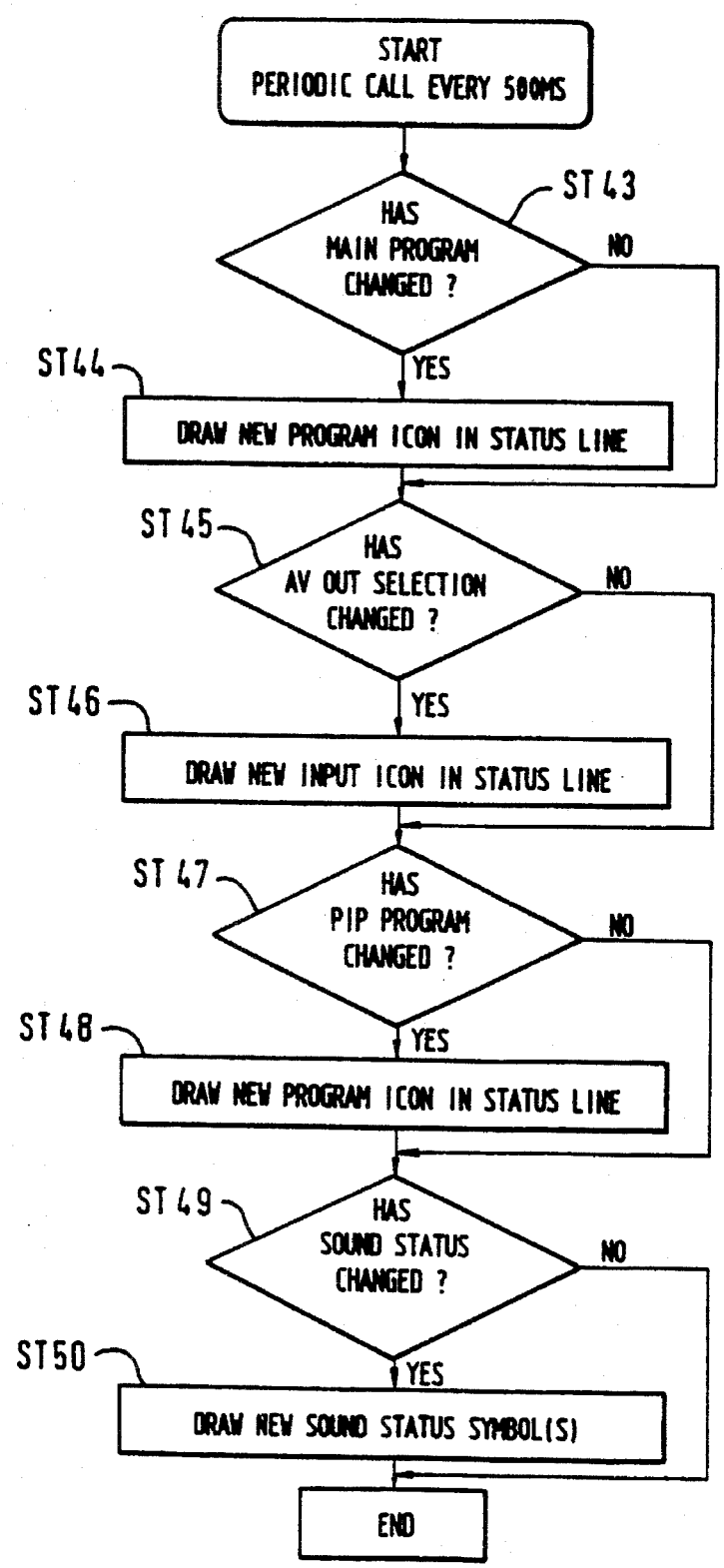
FIG. 17 is a flow chart showing steps to display the status in the control picture CP1 shown in FIG. 3.

In order to display the display areas DA in the control picture CP, especially, as shown in FIG. 17, the display areas DA1 to DA4 in the control picture CP1, it is determined in the step ST43 whether the program to be displayed as the main picture is changed and if changed, the identifying symbol of the program is displayed in the display area DA1 in the step ST44. It is determined in the step ST45 whether the program to be supplied to the AV output 7 is changed and if changed, the identifying symbol of the program is displayed in the display area DA2 in the step ST46. It is determined in the step ST47 whether the PIP mode is changed between on and off and the program to be displayed in the sub-picture is changed and if changed, the identifying symbol of the program of the sub-picture is displayed in the display area DA3 in the step ST48. It is determined in the step ST49 whether the parameters of sound reproduction is changed and if changed, the identifying symbols of the parameters of sound reproduction are displayed in the display area DA4 in the step ST50.

Figure 18:
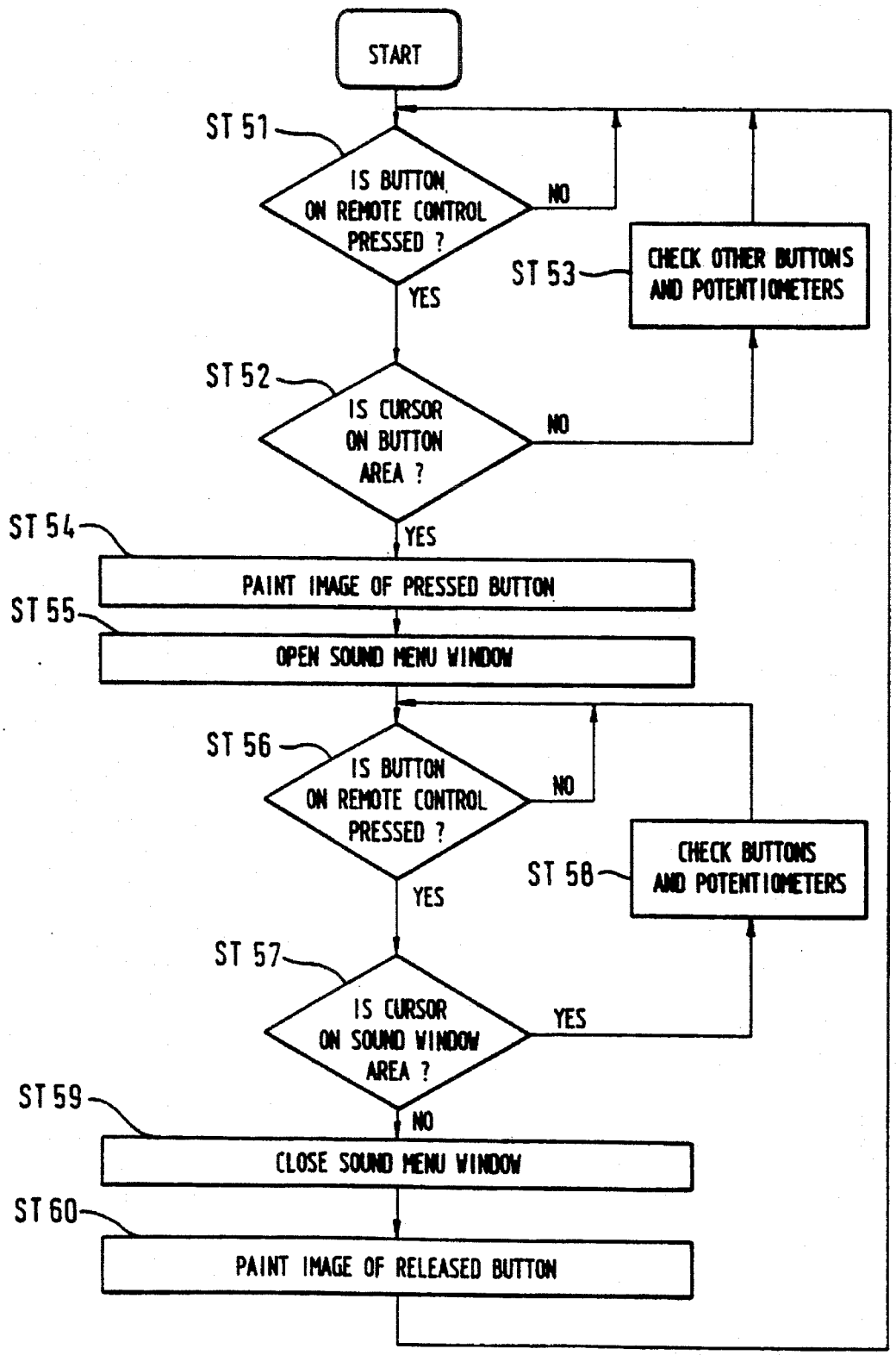
FIG. 18 is a flow chart showing steps to display the control picture CP9, as an example, shown in FIG. 9.

In order to control a control area CA in a control picture CP and display another control picture CP as a window, especially, as shown in FIG. 18, to display the control picture CP7 for sound control, it is determined in the step ST51 whether the click function of the remote controller 3 or 3' is operated. If the click function is operated, it is determined in the step ST52 whether the pointer P is located in the control area CA, for example in the control area CA3 for sound control of the control picture CP1. If the pointer P is not within the control area CA3, it is checked in the step ST53 whether the pointer P is in the other control areas CA. If the pointer P after the click function is operated is in the control area CA3, the shape of the control area CA3 is changed to the shape of the depressed key in the step ST54 and the control picture CP7 for sound control is displayed as a window to overlap on the control picture CP1 in the step ST55. It is determined in the step ST56 whether the click function of the remote controller 3 or 3' is operated again. If the click function is operated, it is determined in the step ST57 whether the pointer P is located in the window of the control picture CP7. If the pointer P is within the control picture CP7, it is checked in the step ST58 whether the pointer P is in any control areas CA in the control picture CP7. If the pointer P is not within the control picture CP7, the control picture CP7 is eliminated to close the window and to fully display the control picture CP1 in the step ST59 and the shape of the control area CA3 in the control picture CP1 is changed to the shape of the undepressed key in the step ST60.

What is claimed is:

1. Audio and/or video reproducing apparatus comprising:

input means supplied with a first plurality of audio and/or video input signals, said input means includes a first input circuit for receiving broadcast signals from broadcasting stations and a second input circuit for receiving a second plurality of audio and/or video input signals from an external device;

processing means connected to said input means for processing the first plurality of audio and/or video input signals in accordance with multiple processing functions, said processing means includes selecting means for selecting audio and/or video input signals from said first plurality for reproduction;

reproducing means connected to said processing means for reproducing a sound and/or a video picture corresponding to the selected audio and/or video input signals;

pointing means for transmitting a control signal;

control means connected to said processing means and coupled to receive the control signal from said pointing means for decoding the control signal, generating a control picture signal in response to the decoded control signal and controlling said processing means;

display means connected to said control means for displaying a control picture corresponding to the control picture signal, the control picture including a plurality of control areas and a pointer movable within the control picture in response to operation of said pointing means, and for displaying identifications of said broadcasting stations and said external device in one or more of the control areas;

wherein said control means selectively modifies the control picture or one of the control areas or controls the processing means in accordance with one of the control areas pointed by the pointer; and wherein said selecting means selects for reproduction one of the audio and/or video input signals from said first plurality corresponding to a control area which displays one of the identifications pointed by the pointer.

2. The apparatus of claim 1, wherein said pointing means comprises a housing and activating keys provided on both sides of said housing for activating said pointing means.

3. The apparatus of claim 1 wherein said pointing means is operable to produce movement information as said pointer moves from one point to another point, said movement information indicating relative direction of said movement.

4. The apparatus of claim 1 wherein said pointing means includes plural pointing devices, each being selectively operable.

5. The apparatus of claim 1, further comprising memory means for storing identifications of the broadcasting stations and said external device and means for displaying said identifications as a table in said control areas.

6. The apparatus of claim 1, wherein said processing means includes data extracting means for extracting data representing identifications of the broadcasting stations from the broadcast signals.

7. The apparatus of claim 1, wherein the displayed identifications of the broadcasting stations are indicia and combinations of symbols which are selectively displayed.

8. The apparatus of claim 1, wherein the control area which is selected by the operation of the pointing means is movable within the control picture under control of said pointing means.

9. The apparatus of claim 1, wherein said control areas exhibit adjustable sizes in accordance with the number of said plurality of control areas.

10. The apparatus of claim 1, wherein said processing means includes a teletext processor to cause a teletext picture including at least a page number image to be displayed and to extract data of the page corresponding to the page number image and to enhance the page number image when the pointer is located at least in the vicinity of the page number image.

11. The apparatus of claim 10 wherein said teletext picture includes time information and said processing means is operable to change the shape of the pointer to a clock shape when the pointer points the location of the time information of said teletext picture.

12. The apparatus of claim 1, wherein at least one of the plurality of control areas not related to the video input signal is not displayed in the control picture in response to information in the video input signal.

13. The apparatus of claim 1, wherein said second input circuit receives a third plurality of audio and/or video signals from a plurality of external devices.

14. The apparatus of claim 1, wherein said plurality of control areas includes a plurality of device control areas; wherein said control means generates device control signals for controlling said external device in accordance with one of the device control areas pointed by the pointer; and further comprising an output circuit, coupled to said control means, for supplying device control signals to said external device.

15. The apparatus of claim 2, wherein transmission of said control signal is inhibited unless one of said activating keys is depressed.

16. The apparatus of claim 4, wherein said plurality of control areas includes a pointer control area; and wherein said control means receives the control signal from one of said pointing devices but not from another of said pointing devices in accordance with the pointer control area pointed by the pointer.

* * * * *